(12) United States Patent
Loncar et al.

(10) Patent No.: US 9,727,033 B2
(45) Date of Patent: Aug. 8, 2017

(54) METHOD FOR PRODUCING PLC AND HMI TAG DATABASE AND SYSTEM

(71) Applicants: Bosko Loncar, Hamilton (CA); Daniel Leskovec, Hamilton (CA)

(72) Inventors: Bosko Loncar, Hamilton (CA); Daniel Leskovec, Hamilton (CA)

(73) Assignee: 2362738 Ontario Inc., Hamilton (CA)

( * ) Notice: Subject to any disclaimer, the term of this patent is extended or adjusted under 35 U.S.C. 154(b) by 539 days.

(21) Appl. No.: 14/200,829

(22) Filed: Mar. 7, 2014

(65) Prior Publication Data

US 2014/0316540 A1     Oct. 23, 2014

Related U.S. Application Data

(60) Provisional application No. 61/774,680, filed on Mar. 8, 2013.

(51) Int. Cl.
| | | |
|---|---|---|
| *G05B 15/00* | (2006.01) | |
| *G05B 11/01* | (2006.01) | |
| *G05B 19/05* | (2006.01) | |
| *G06F 19/00* | (2011.01) | |
| *G06F 17/30* | (2006.01) | |
| *G06Q 50/00* | (2012.01) | |

(52) U.S. Cl.
CPC ............ *G05B 11/01* (2013.01); *G05B 19/056* (2013.01); *G06F 17/30289* (2013.01); *G06Q 50/00* (2013.01)

(58) Field of Classification Search
CPC .. G05B 23/0216; G05B 11/01; G05B 19/056; G05B 19/4186; G06Q 10/08; Y02P 90/265; Y02P 90/16; Y02P 90/185; Y02P 90/18

See application file for complete search history.

(56) References Cited

U.S. PATENT DOCUMENTS 6,799,080 B1 * 9/2004 Hylden ................ G05B 19/409
 340/3.1
7,117,043 B1 * 10/2006 Frederick ............. G05B 19/056
 700/21

(Continued)

OTHER PUBLICATIONS

Park et al., PLCStudio: simulation based PLC code verification, Dec. 2008, 7 pages.*

(Continued)

*Primary Examiner* — Thuy Dao
(74) *Attorney, Agent, or Firm* — Lipsitz & McAllister, LLC

(57) ABSTRACT

A method and system for producing a plc tag database is provided. The method is for use with a set of fragment types, a set of tag values for each fragment type and a collection of PLC programming logic. The collection contains a PLC programming code for each of a plurality of classes of equipment. A PLC tag database is produced for a project. The classes of equipment required for the project are selected together with a quantity required for each class of equipment selected. A PLC logic associated with the PLC programming code for said each class, and tags defined by the PLC logic, are replicated a number of times equal to the quantity of each class selected. A specific PLC card type, rack and slot is assigned to selected tags in accordance with the requirements of the project.

17 Claims, 43 Drawing Sheets

(56) References Cited

U.S. PATENT DOCUMENTS

| | | | | |
|---|---|---|---|---|
| 7,272,457 B2* | 9/2007 | Glanzer | ................ | G05B 15/02 |
| | | | | 700/83 |
| 7,308,327 B2* | 12/2007 | Coburn | ............. | G05B 19/4185 |
| | | | | 700/97 |
| 7,860,589 B2* | 12/2010 | Bliss | .................... | G05B 19/056 |
| | | | | 700/19 |
| 8,898,633 B2* | 11/2014 | Bryant | ................ | G05B 19/056 |
| | | | | 717/106 |
| 2006/0200256 A1* | 9/2006 | Mason | ................ | G05B 19/054 |
| | | | | 700/65 |
| 2010/0247096 A1* | 9/2010 | Emery | ................ | H04J 14/0227 |
| | | | | 398/30 |
| 2014/0316540 A1* | 10/2014 | Loncar | ................ | G05B 19/056 |
| | | | | 700/79 |
| 2016/0028693 A1* | 1/2016 | Crawford | ............ | H04L 63/0281 |
| | | | | 726/12 |

OTHER PUBLICATIONS

Thapa et al., Modeling, verification, and implementation of PLC program using timed-MPSG, Jul. 2007, 8 pages.*

* cited by examiner

```
FragmentTypeName
Fragment 1 - Facility
Active      FragName  FragDescription
ID   TRUE   MSS       MAIN STREET SEWAGE PUMPING STATION
N    TRUE   WSS       WEST SIDE SEWAGE PUMPING STATION
N    TRUE   ESS       EAST SIDE SEWAGE PUMPING STATION
N    TRUE   NBS       NORTH END BOOSTER STATION FragmentTypeName
Fragment 2 - Major Equipment
Active      FragName  FragDescription
ID   TRUE   SLP       SEWAGE LIFT PUMP
N    TRUE   WWL       WET WELL
N    TRUE   SSP       BOOSTER PUMP FragmentTypeName
Fragment 3 - Minor Equipment
Active      FragName  FragDescription
ID   TRUE   LT        LEVEL TRANSMITTER
N    TRUE   FT        FLOW TRANSMITTER
N    TRUE   PB        PUSH BUTTON FragmentTypeName
Fragment 4 - PLC Field I/O
Active      FragName  FragDescription
ID   TRUE   ALMDI
N
```

Equipment Class Pump and Analog Added

METHOD FOR PRODUCING PLC AND HMI TAG DATABASE AND SYSTEM

The present application claims the benefit of U.S. provisional patent application No. 61/774,680 filed on Mar. 8, 2013, which is incorporated herein and made a part hereof by reference in its entirety and for all purposes.

FIELD

The invention relates to the field of industrial automation.

BACKGROUND

A Programmable Logic Controller (PLC) is a digital computer used for automation of processes such as assembly lines. A single installation may have hundreds or even thousands of PLC devices interconnected to one another, and these devices are commonly under control of a single PLC program, written in ladder logic or other languages, with each device having a dedicated set of PLC code. This can result in a PLC program having tens of thousands of lines of code, which necessarily creates management and quality control issues.

To minimize these issues, it is conventional for institutional users to adopt a tag naming convention as well as a standard PLC tag and logic file. The tag naming convention consists of a plurality of fragment values which are adopted consistently as needed. The standard PLC tag and logic file includes a plurality of generic code sets applicable to different broad types of equipment. This consistency renders it easier to introduce programmers to a project team, as the new programmers can more readily follow the logic and flow.

However, even with conventions and standard logic, project coding can be labor intensive; in the creation of a PLC program for a project, it is conventional for coders to manually replicate a portion of the standard logic for each piece of equipment and to manually customize the code thereafter. Projects can entail hundreds or thousands of hours of effort and even if skilled programmers are used, it is not uncommon for errors to occur, which can result in significant efforts spent debugging.

SUMMARY OF THE INVENTION

A method for producing a PLC tag database for a project forms one aspect of the invention. The method is for use with a set of fragment types, a set of tag values for each fragment type and a collection of PLC programming logic. The collection contains a PLC programming code for each of a plurality of classes of equipment. The method comprises the steps of:
  in respect of the project, selecting: the classes of equipment required for the project; and in respect of each class of equipment selected, the quantity required;
  in respect of each class of equipment selected, and through the use of the set of fragment types, the sets of tag values and the collection of PLC programming, replicating, a number of times equal to the quantity of said each class selected: a PLC logic associated with the PLC programming code for said each class; and tags defined by the PLC logic and in accordance with a tag naming convention; and
  assigning a specific PLC card type, rack and slot to selected tags in accordance with the requirements of the project.

According to another aspect: the set of fragment types can be a user-defined subset of the tag naming convention; the set of tag fragment values can be a user-defined subset of the tag naming convention; and the PLC programming code for each selected class can be a user-defined subset of a standard PLC tag and logic file.

According to another aspect, the replication step can involve the creation of: a plurality of user-defined equipment classes from which the classes required for the project are selected; a plurality of user-defined linkages between each user-defined class of equipment and a portion of a standard PLC tag and logic file, each linkage being associated with the definition of a member of said each class; in respect of each member, a user-defined data type, a user defined field I/O type and definitions of associated fragment properties.

According to another aspect, the replication step can further involve the creation of one or more of: a user-defined static variable substitution relationship associating a portion of one of the PLC logics with a user-defined variable such that, as the replication step is carried out, each time that one of the PLC logics is replicated, the user defined variable is substituted for that portion; a user-defined dynamic variable substitution relationship associating a portion of one of the PLC logics with a system variable such that, as the replication is carried out, each time that portion of the one of the PLC logics is replicated, a programming code is substituted therefor, the substituted programming code being context-dependent; and a user-defined code snippet, associated substitution rule and associated trigger, the trigger being defined by one or more of equipment class, member and I/O type, such that, as the replication is carried out, the code snippet is replicated in accordance with the associated substitution rule for each instance of the associated trigger.

According to another aspect, each dynamic variable can be associated with a discrete portion of a tag structure such that, as the tags and PLC logic for a piece of equipment are replicated, in the tag for said piece of equipment, that discrete portion is populated in accordance with the properties of that piece of equipment.

According to another aspect, the replication step can involve the creation of a template including: the subsets of the tag naming convention and the user-defined equipment classes; the plurality of linkages between class of equipment and the portion of a standard PLC tag and logic file; in respect of each member, the defined data type and field I/O and associated fragment property definitions; the static variable substitution relationships; the dynamic substitution relationships; and the code snippets, associated substitution rules and associated triggers.

According to another aspect, in the template, the associated fragment property definitions can include indications if the fragment is defined within the template.

According to another aspect: the template can include, in respect of fragments in respect of which the template provides an indication of inclusion, definitions; and fragments for the project, other than those in respect of which the template provides an indication of inclusion, are defined as part of a project definition step wherein the selection of equipment and quantities thereof also takes place.

According to another aspect, the replication step can further involve the creation of, in respect of each member, HMI tag properties; and the method results in the production of an HMI tag database.

According to another aspect, each dynamic variable can be associated with an I/O hardware point such that the associated I/O address for said I/O point is auto-populated throughout the PLC tag database when the PLC card type, rack and slots are assigned.

According to another aspect, the replication step can involve the creation of a template including: the subsets of the tag naming convention and the user-defined equipment classes; the plurality of linkages between class of equipment and the portion of a standard PLC tag and logic file; in respect of each member, the defined data type and field I/O and associated fragment property definitions; the static and dynamic variable substitution relationships, the code snippets, associated substitution rules and associated triggers; and in respect of each member, the HMI tag properties.

According to another aspect, in the template, the associated fragment property definitions can include indications if the fragment is defined within the template.

According to another aspect: the template can include, in respect of fragments in respect of which the template provides an indication of inclusion, definitions; and fragments for the project, other than those in respect of which the template provides an indication of inclusion, are defined as part of a project definition step wherein the selection of equipment and quantities thereof also takes place.

According to another aspect, the substitution rules associated with the code snippets can provide for one of: the addition of a new routine to a program; the addition of a new rung to a routine; and the addition of a new tag.

According to another aspect, the triggers can comprise: the assignment of an analog input to an equipment class member; the assignment analog output to an equipment class member; the assignment digital alarm to an equipment class member; the assignment digital input to an equipment class member; the assignment digital output to an equipment class member; and the creation of an instance of an equipment class.

According to another aspect, the code snippets can form part of the PLC logic in respect of which portions may be associated with the dynamic and static substitution variables.

A computer specially designed for producing the template form another aspect of the invention.

A computer specially designed for carrying out a method for a project with the template forms yet another aspect of the invention. The method carried out by the computer comprises the steps of:
  in respect of the project, selecting: the classes of equipment required for the project; and, in respect of each class of equipment selected, the quantity required;
  in respect of each class of equipment selected, and through the use of the template, replicating, a number of times equal to the quantity of said each class selected: a PLC logic associated with the PLC programming code for said each class; and tags defined by the PLC logic and in accordance with a tag naming convention; and
  assigning a specific PLC card type, rack and slot to selected tags in accordance with the requirements of the project.

Through the use of the invention, a PLC program for a project can be created relatively quickly.

Other advantages, features and characteristics of the present invention will become apparent upon consideration of the following detailed description and the appended claims with reference to the accompanying drawings, the latter being briefly described hereinafter.

BRIEF DESCRIPTION OF THE DRAWINGS

FIG. 5 is a view of the screen of a computer specially adapted to carry out a method according to an exemplary embodiment of the invention, in use FIG. 6 is a view of the screen of a computer specially adapted to carry out a method according to an exemplary embodiment of the invention, in use FIG. 8 is a view of the screen of a computer specially adapted to carry out a method according to an exemplary embodiment of the invention, in use FIG. 9 is a view of the screen of a computer specially adapted to carry out a method according to an exemplary embodiment of the invention, in use FIG. 17 is a view of the screen of a computer specially adapted to carry out a method according to an exemplary embodiment of the invention, in use FIG. 18 is a view of the screen of a computer specially adapted to carry out a method according to an exemplary embodiment of the invention, in use FIG. 23 is a view of the screen of a computer specially adapted to carry out a method according to an exemplary embodiment of the invention, in use FIG. 36 is a view of the screen of a computer specially adapted to carry out a method according to an exemplary embodiment of the invention, in use

DETAILED DESCRIPTION

As previously indicated, the present invention involves, in one aspect, a method.

Reference is now made to FIGS. 1-40, which show screen shots produced by a computer loaded with application software and thereby specially designed to facilitate the method. These screen shots, coupled with the following text, fully describe the method and the functionality of the computer; persons of ordinary skill in the art, on the basis of the foregoing, will be readily able to produce software of equivalent functionality, and accordingly, the specific software code associated with the exemplary embodiment is neither enclosed nor required.

Figure 1:
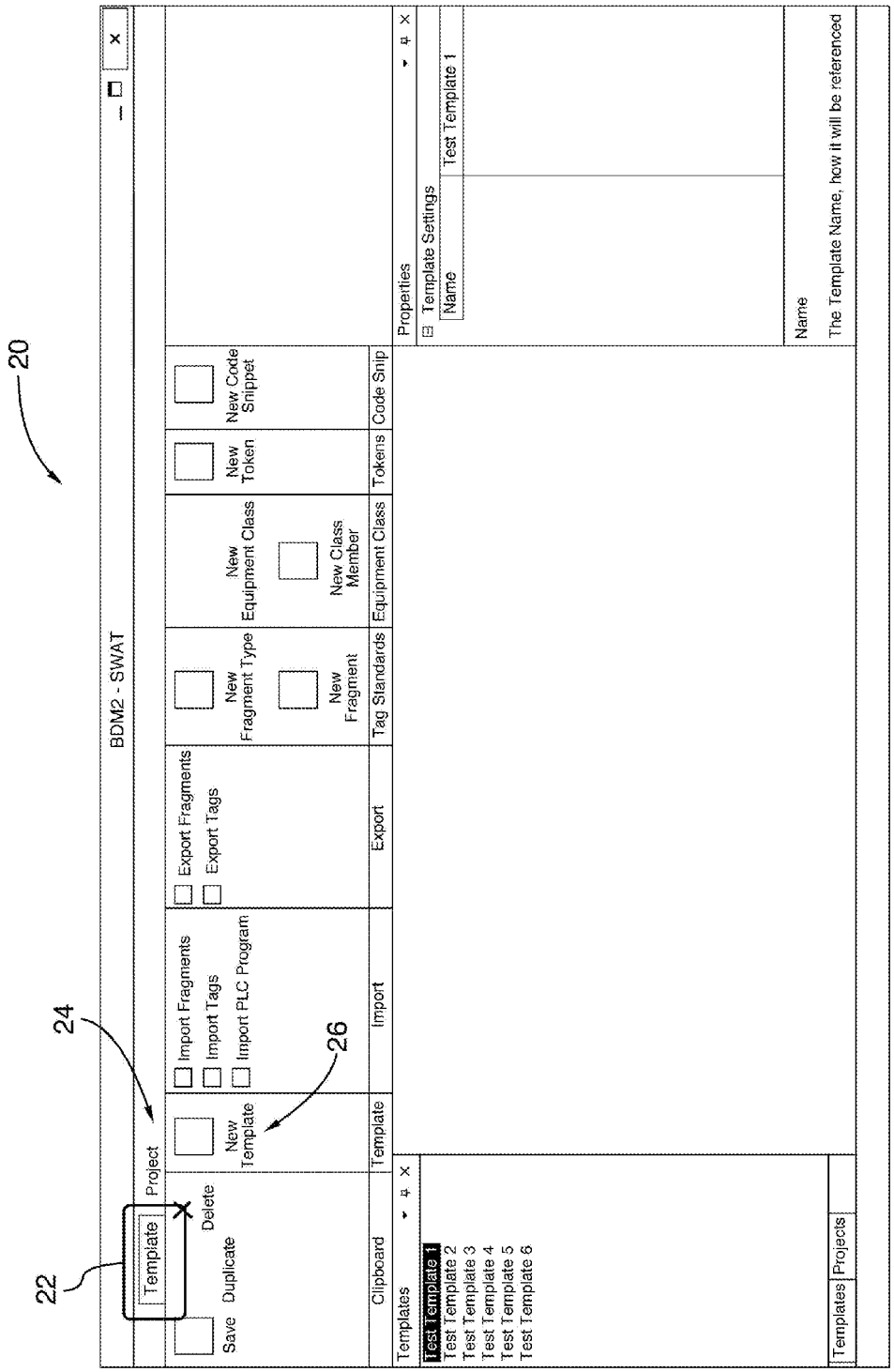
FIG. 1 is a view of the screen of a computer specially adapted to carry out a method according to an exemplary embodiment of the invention, in use
Figure 2:
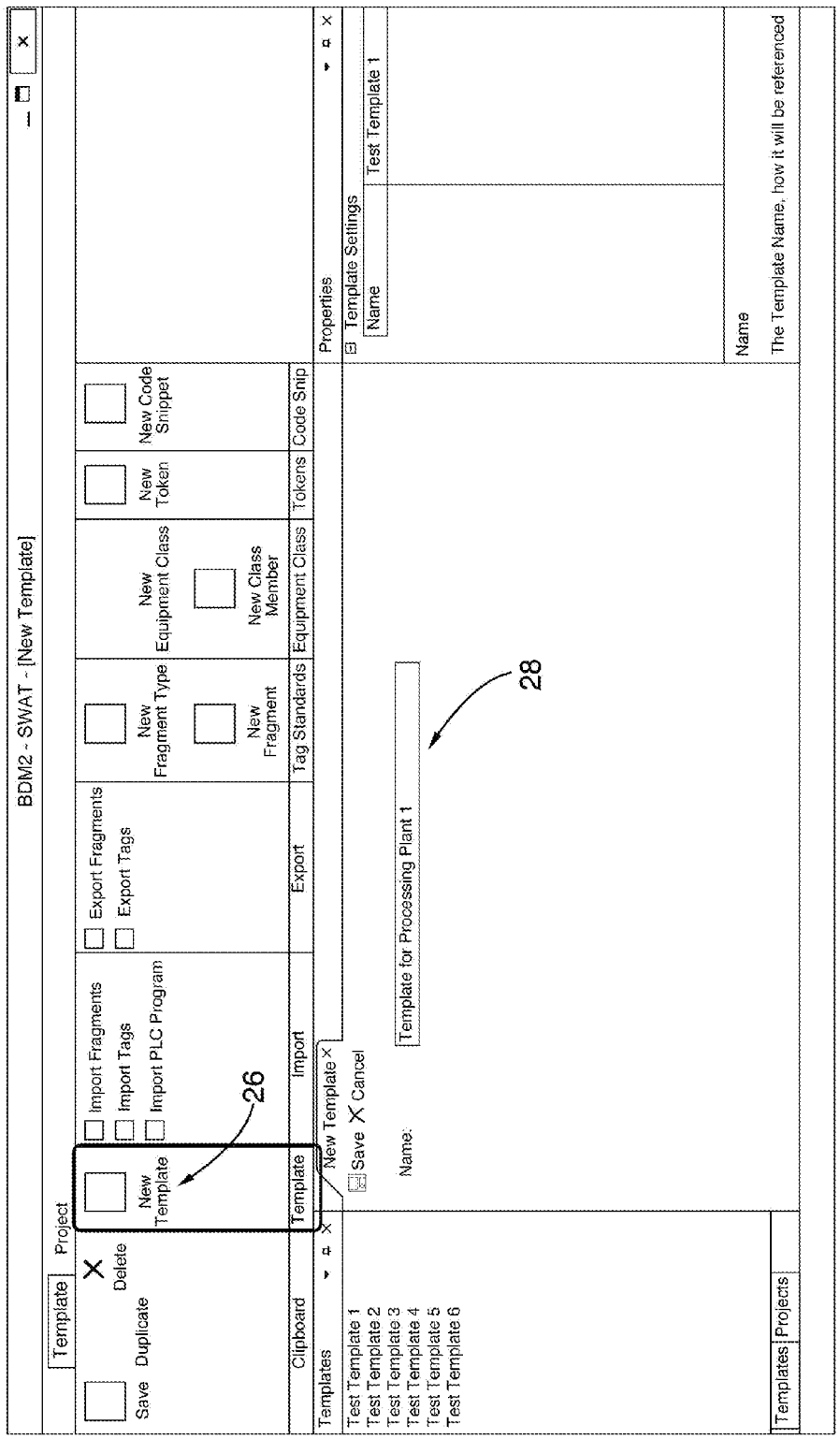
FIG. 2 is a view of the screen of a computer specially adapted to carry out a method according to an exemplary embodiment of the invention, in use
Figure 3:
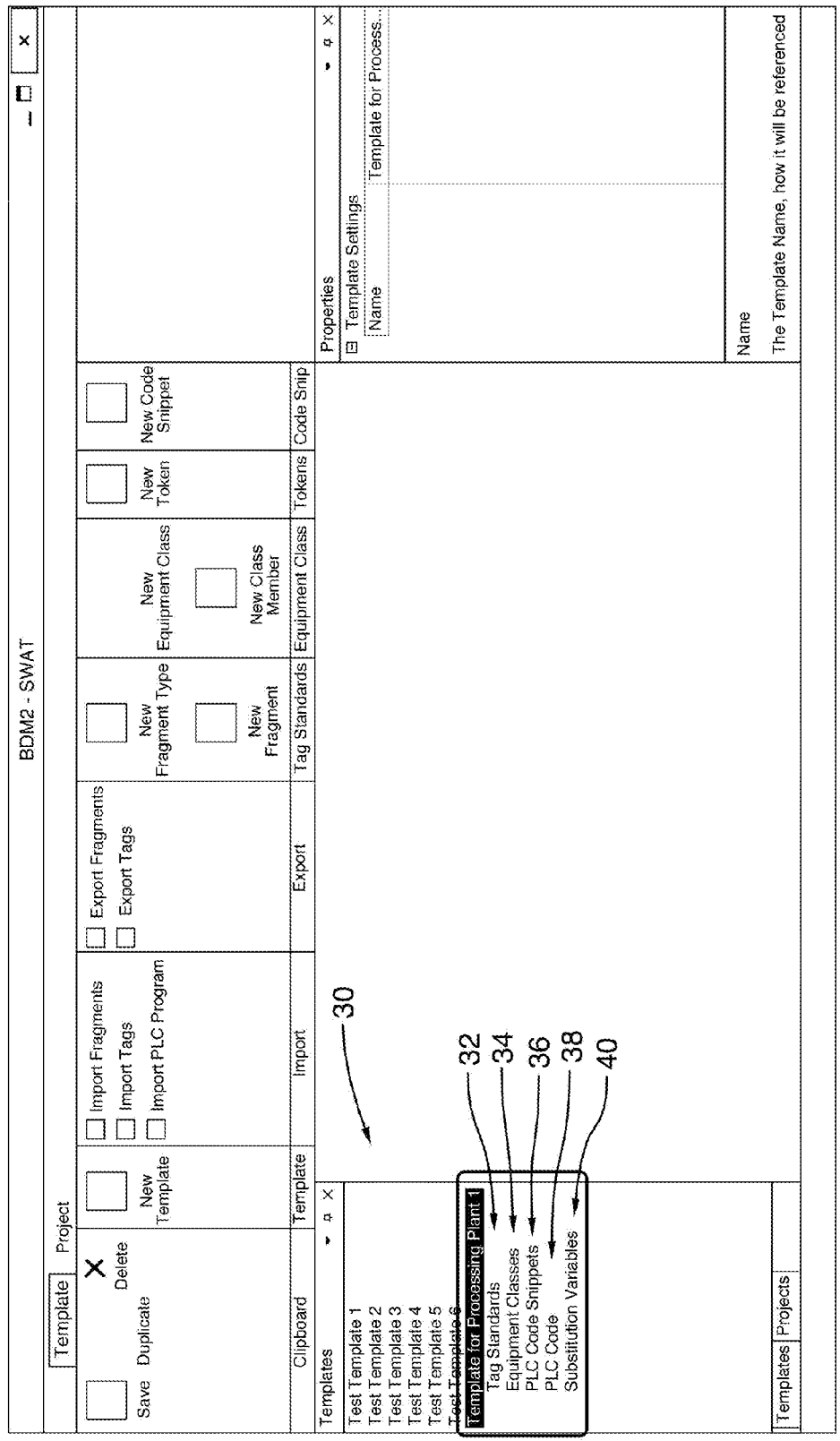
FIG. 3 is a view of the screen of a computer specially adapted to carry out a method according to an exemplary embodiment of the invention, in use

With reference to FIG. 1, it will initially be understood that the exemplary method involves a template creation step and a project builder step and the software thus allows a user to toggle between template builder and project builder functionality, by selection of the appropriate one of Template icon 22 and Project icon 24 on a landing page 20.

Template Creation

An initial step in the creation of a template involves the selection of a name. By way of non-limiting example, the template may be created by a consulting firm that acts for numerous clients and the name of the template chosen may correspond to the name of the client. In the context of the exemplary computer-implemented method, the creation of a template involves, as suggested by FIG. 2, selection of a New Template icon 26 and an appropriate entry in a Name text input box 28, in this case, "Template for Processing Plant 1".

The next step involves procurement of (i) a set of fragment types, a set of tag values for each fragment type and (ii) a collection of PLC programming.

With respect to fragment types and values, the first step is to select one of the available templates in the Clipboard area 30, which expands to reveal the following buttons: Tag Standards 32, Equipment Classes 34, PLC Code Snippets 36, PLC Code 38 and Substitution Variables 40.

So expanded, selection of the Tag Standards button 32 in the Clipboard portion 30 enables the appropriate functionality within the software.

Figure 4:
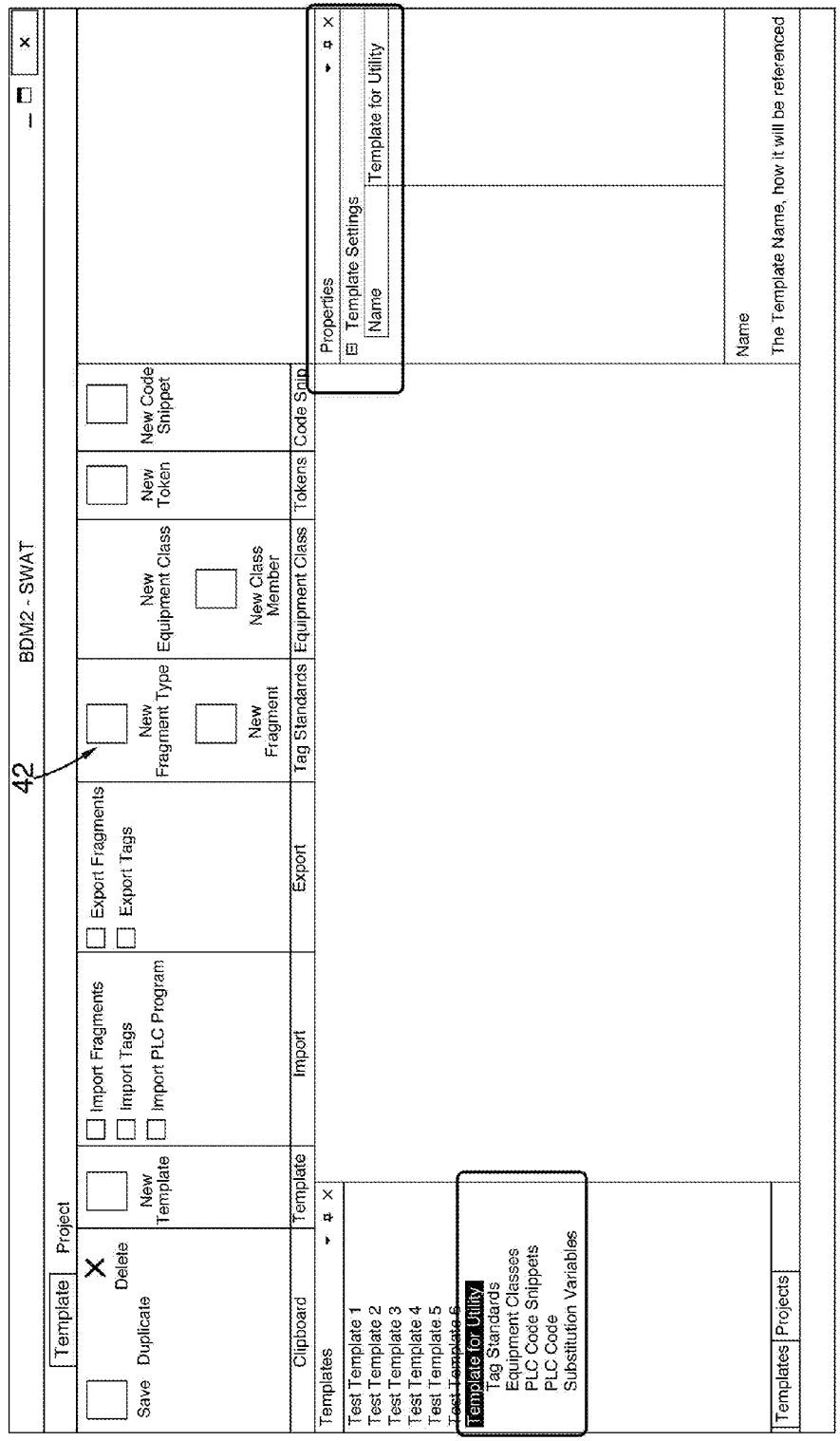
FIG. 4 is a view of the screen of a computer specially adapted to carry out a method according to an exemplary embodiment of the invention, in use
Figure 5:
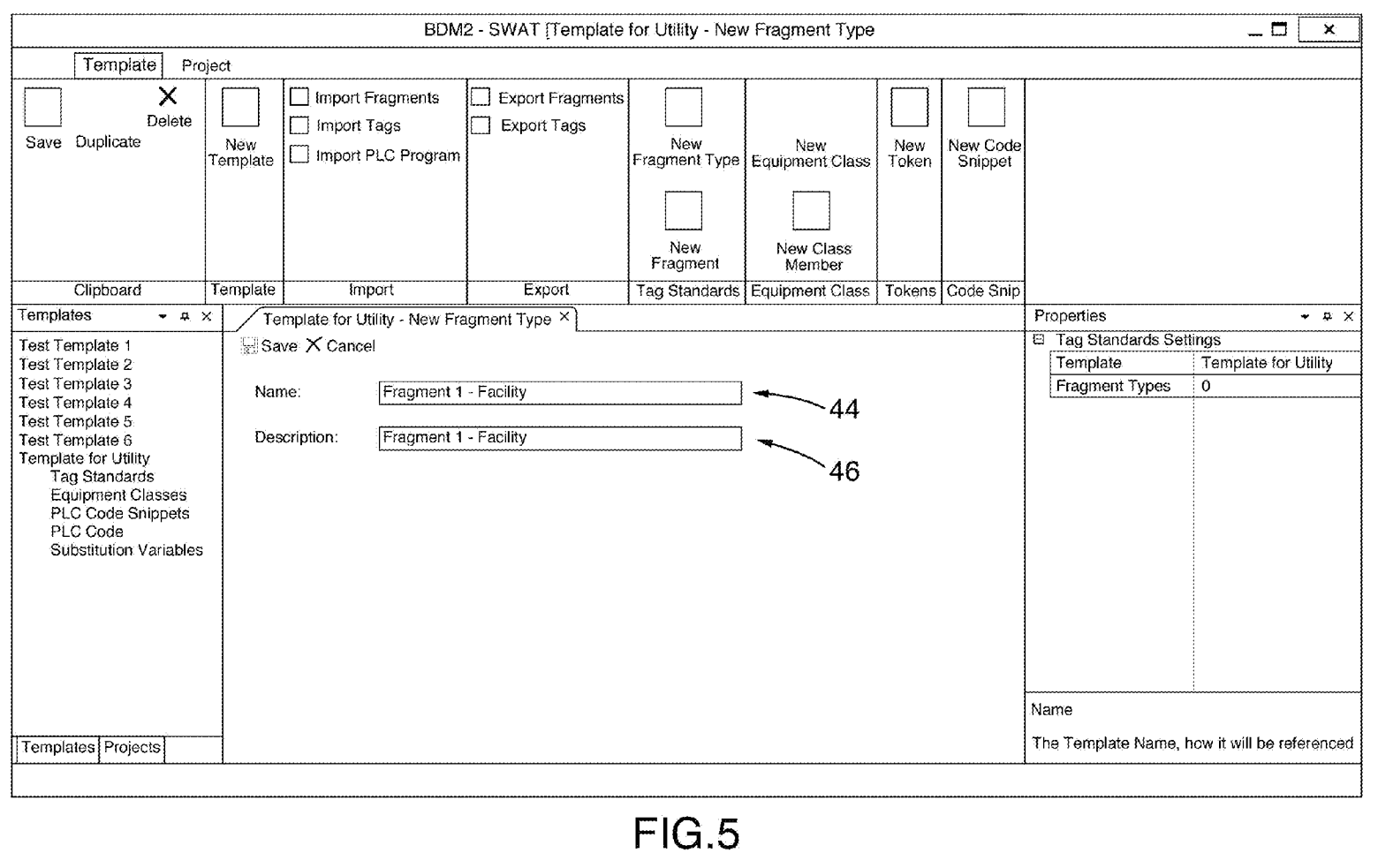

Fragment types can thereafter be created manually, by selecting, as indicated by FIG. 4, New Fragment Type icon 42, and placing appropriate entries in the Name 44 and Description 46 text entry blocks that are created, as shown in FIG. 5, in this case, "Fragment 1—Facility" and "Fragment 1—Facility".

Figure 6:
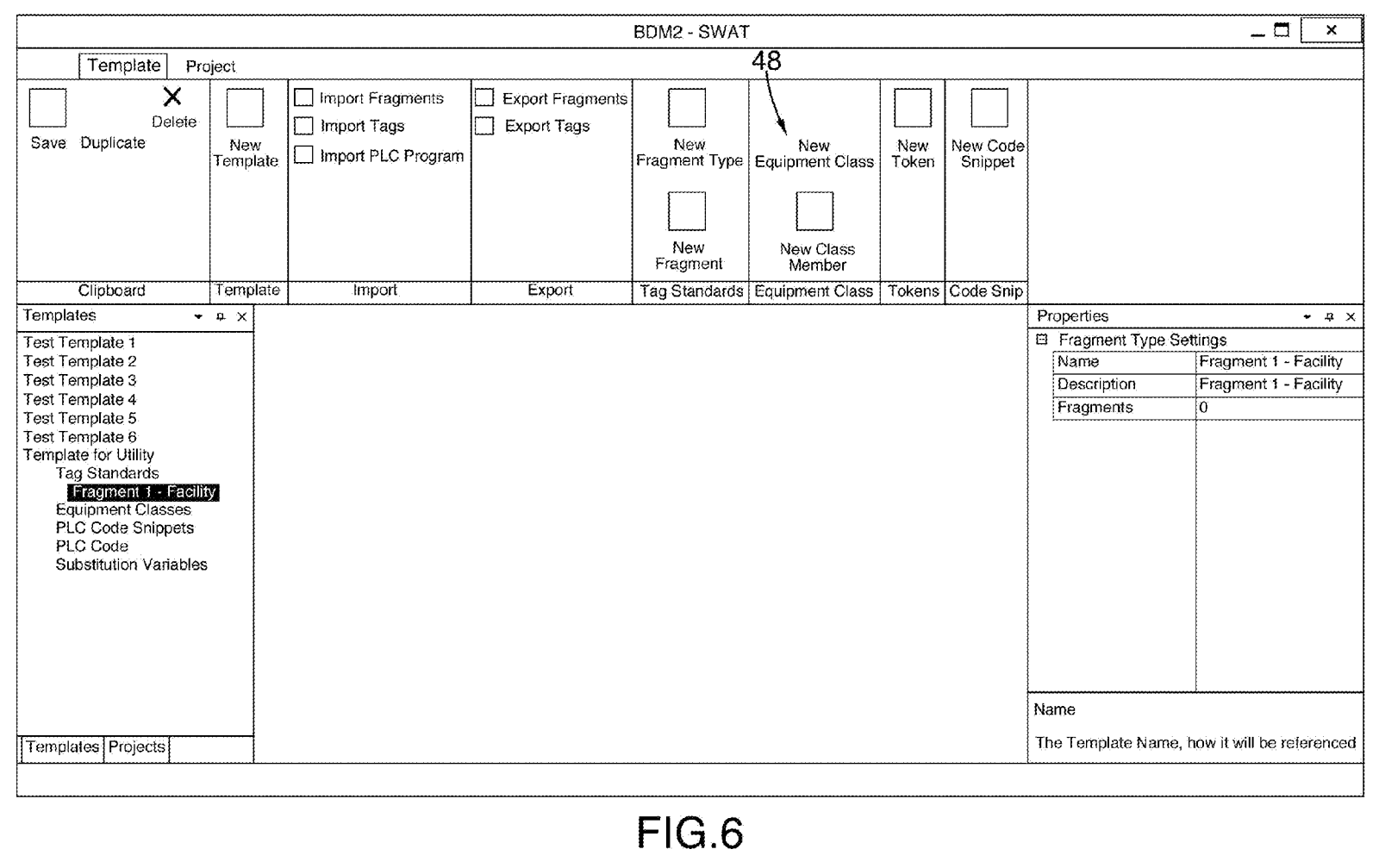
Figure 7:
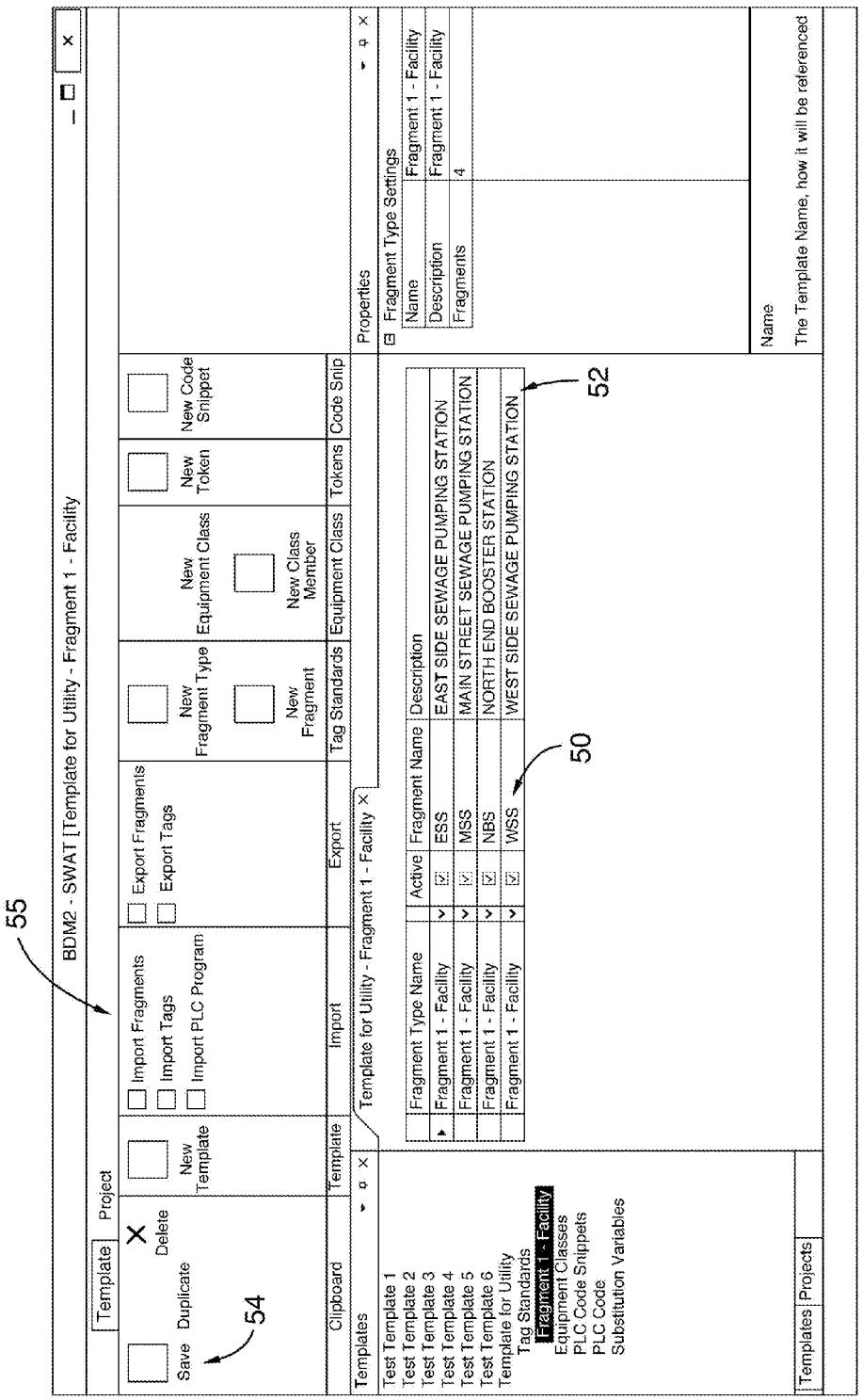
FIG. 7 is a view of the screen of a computer specially adapted to carry out a method according to an exemplary embodiment of the invention, in use

Fragment values can also be created manually, by selecting, as indicated by FIG. 6, the New Fragment icon 48, placing appropriate entries in the Fragment name 50 and Description 52 text entry boxes that appear, and saving the values by selection of the Save icon 54. In FIG. 7, the values ESS, MSS, NBS and WBS have been entered for Fragment Type "Fragment 1—Facility", these corresponding to "East Side Sewage Pumping Station", "Main Street Sewage Pumping Station", "North End Booster Station" and "West Side Sewage Pumping Station".

However, the fragment values can and often will be imported from a tag naming convention file, using the Import Fragments icon 55, which activates a standard file browser, not shown, for importing all or part of any CSV file selected. A template of a CSV file suitable for importation is enclosed as FIG. 8.

Figure 9:
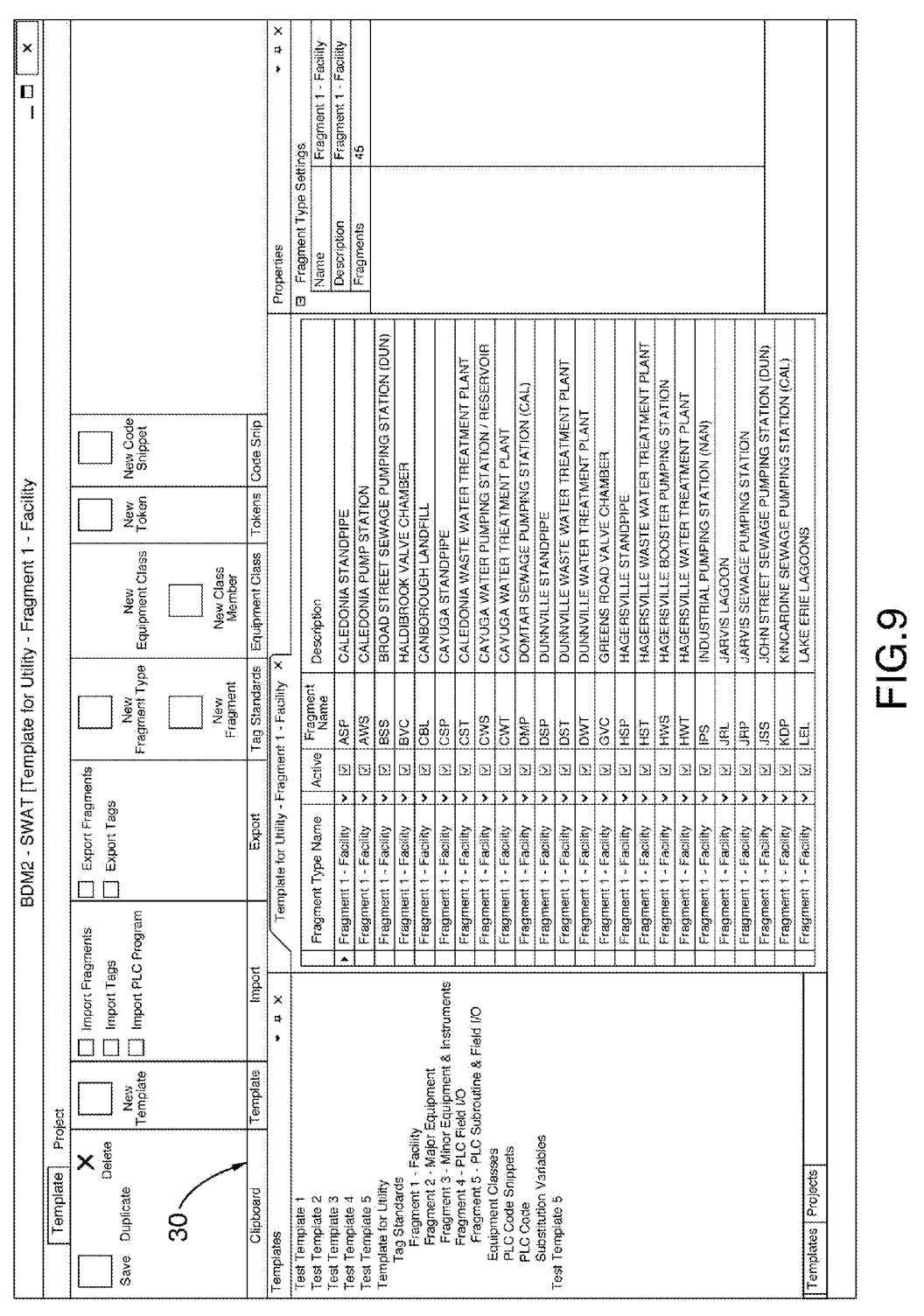

FIG. 9 shows an exemplary end result of the process: the Template called "Template for Utility" has been populated with standard values for fragment types "Fragment 1—Facility", "Fragment 2—Major Equipment, "Fragment 3—Minor Equipment and Instruments", "Fragment 4—PLC Field I/O" and "Fragment 5—Subroutines & Field I/O". In FIG. 9, only a portion of the Fragment 1 values are shown, but it will be appreciated that the balance of the Fragment 1 values could be viewed by scrolling the list, and the values for the other fragments types could be viewed by selecting the fragment types in the Clipboard 30.

Figure 10:
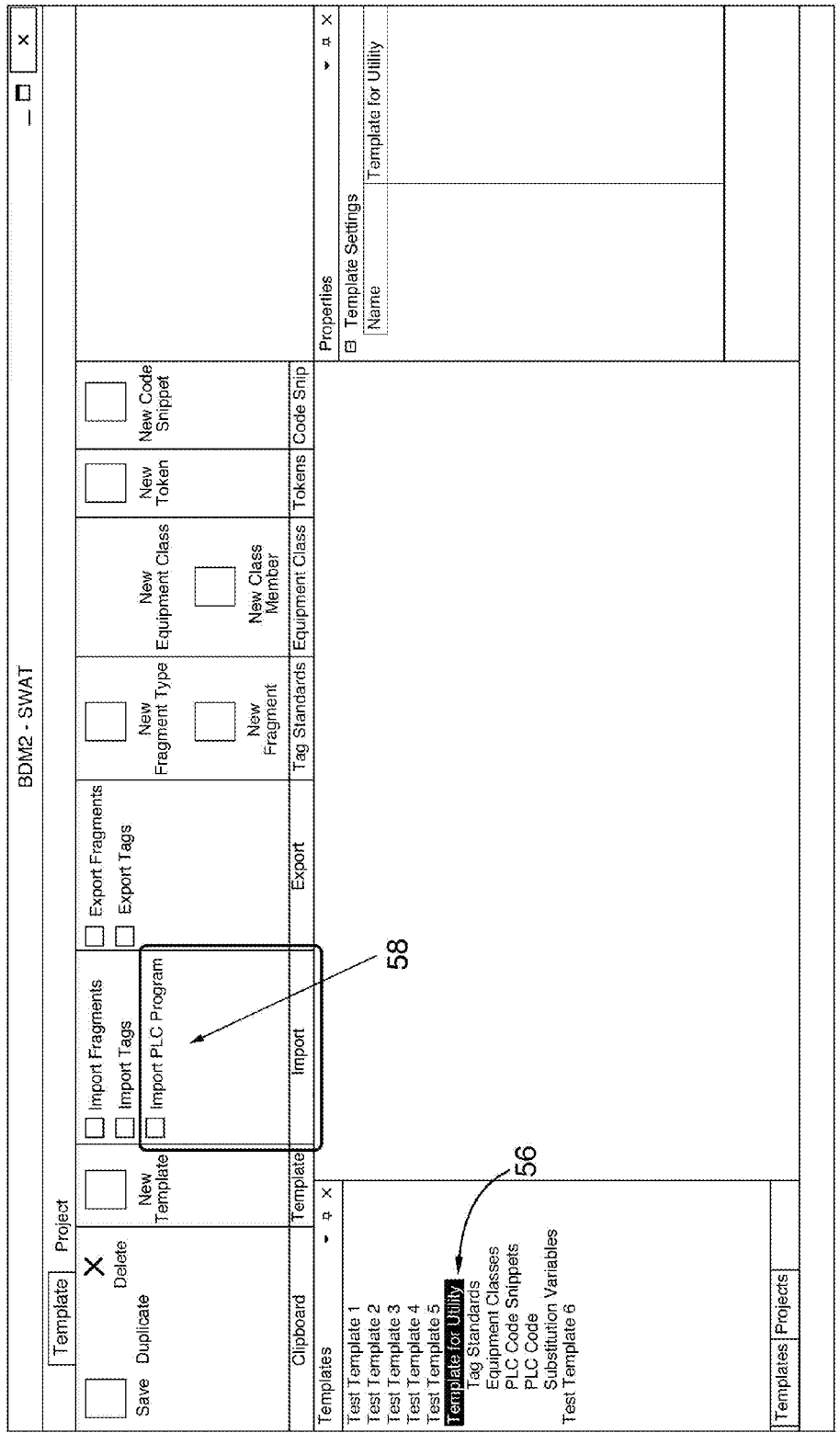
FIG. 10 is a view of the screen of a computer specially adapted to carry out a method according to an exemplary embodiment of the invention, in use
Figure 11:
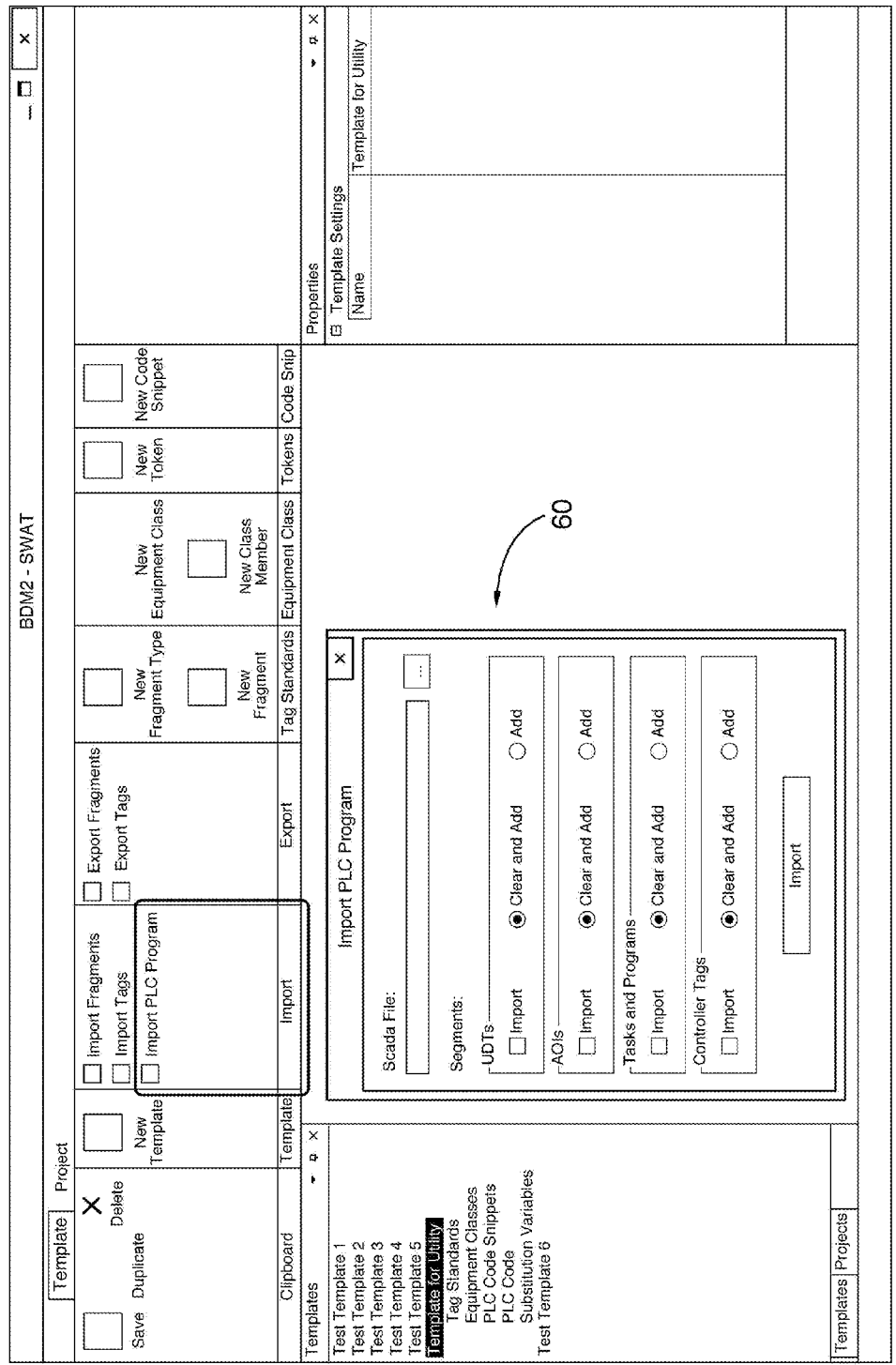
FIG. 11 is a view of the screen of a computer specially adapted to carry out a method according to an exemplary embodiment of the invention, in use
Figure 12:
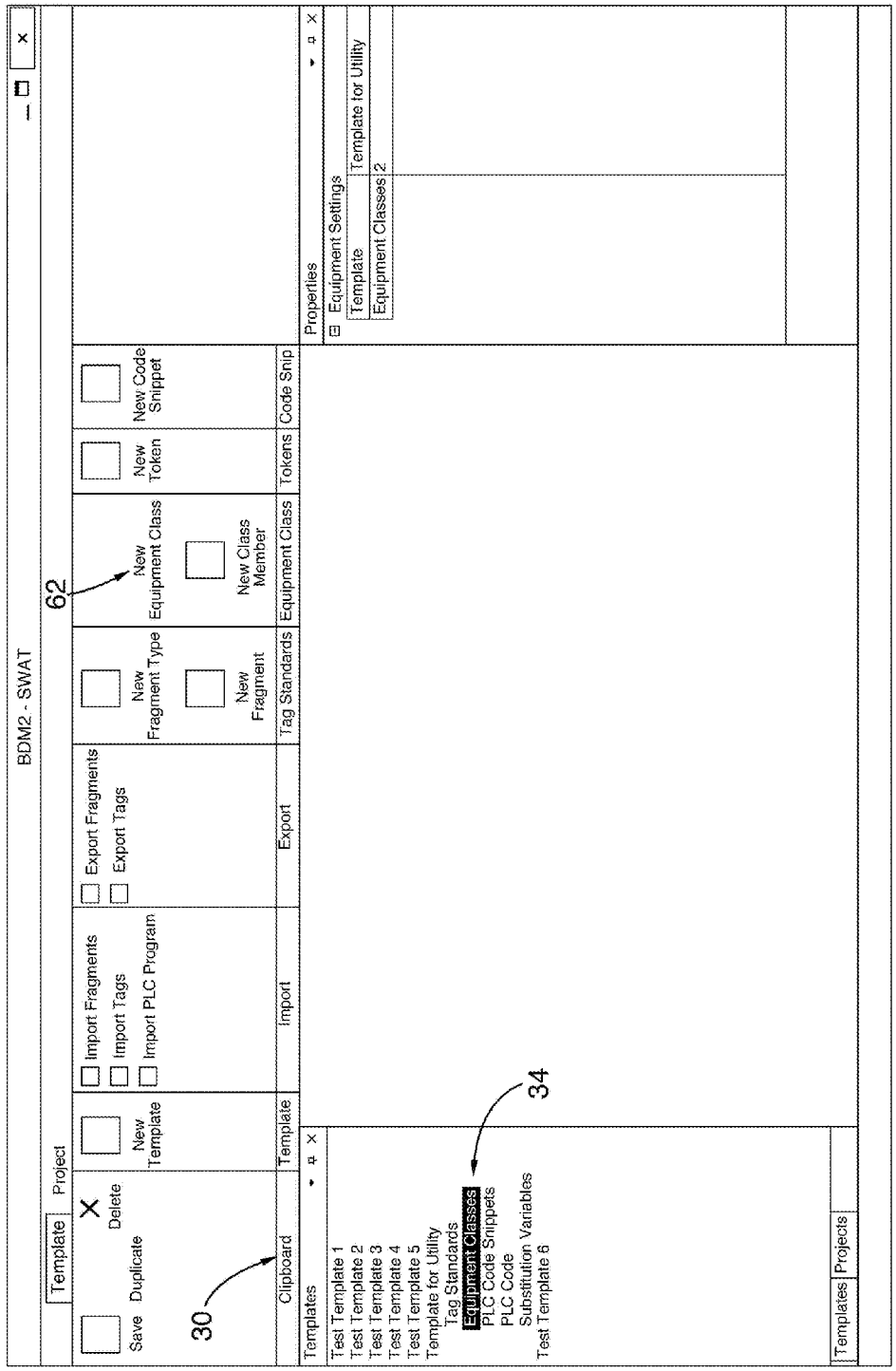
FIG. 12 is a view of the screen of a computer specially adapted to carry out a method according to an exemplary embodiment of the invention, in use

The next step is to import the standard PLC Tag Database and Logic file, by activating the appropriate functionality of the software by returning to the template launch area by selecting the Template for Utility button 56 and then selecting the Import PLC Program icon 58, as indicated in FIG. 10. This activates a selection block 60, as shown in FIG. 11, wherein the user can select a PLC program file to be imported, and select which portions of the file will be imported, specifically, UDT, AOI, Tasks and Programs and Tags. FIG. 12 shows all portions of file F:\BXX1_V7_V17.ACD about to be imported. This process can be repeated for multiple files, if necessary. Once all of the relevant data imported, the next step is the creation of equipment classes, which commences with selection of the Equipment Classes button 34 in the Clipboard 30, as indicated by FIG. 12

Equipment classes are thereafter created, one for each class of equipment to be included within the template.

Figure 13:
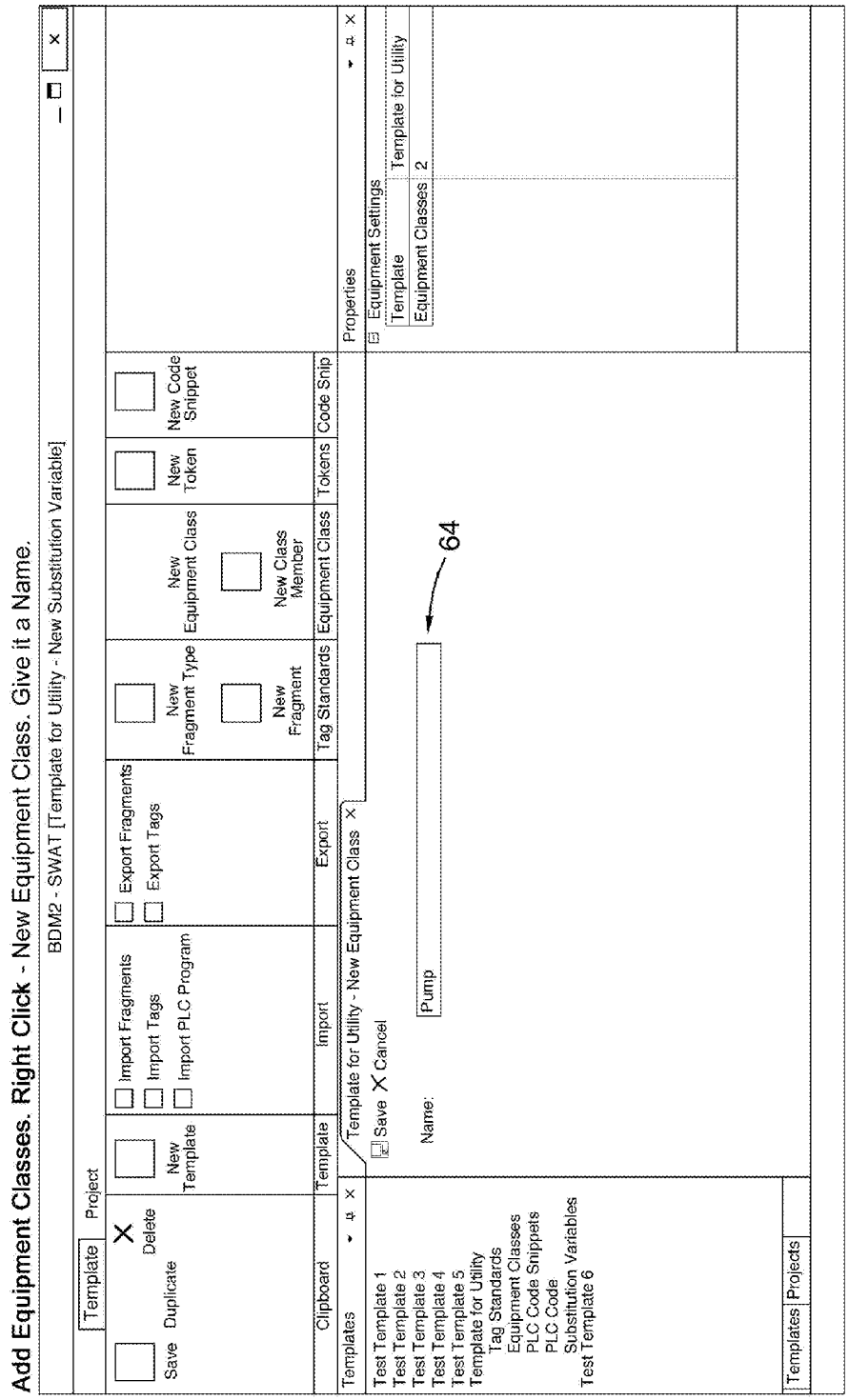
FIG. 13 is a view of the screen of a computer specially adapted to carry out a method according to an exemplary embodiment of the invention, in use

To create an equipment class, the user selects the New Equipment Class icon 62, and thereafter enters an appropriate word or phrase in a Name text entry block 64, such as, in FIG. 13, "pump".

Figure 14:
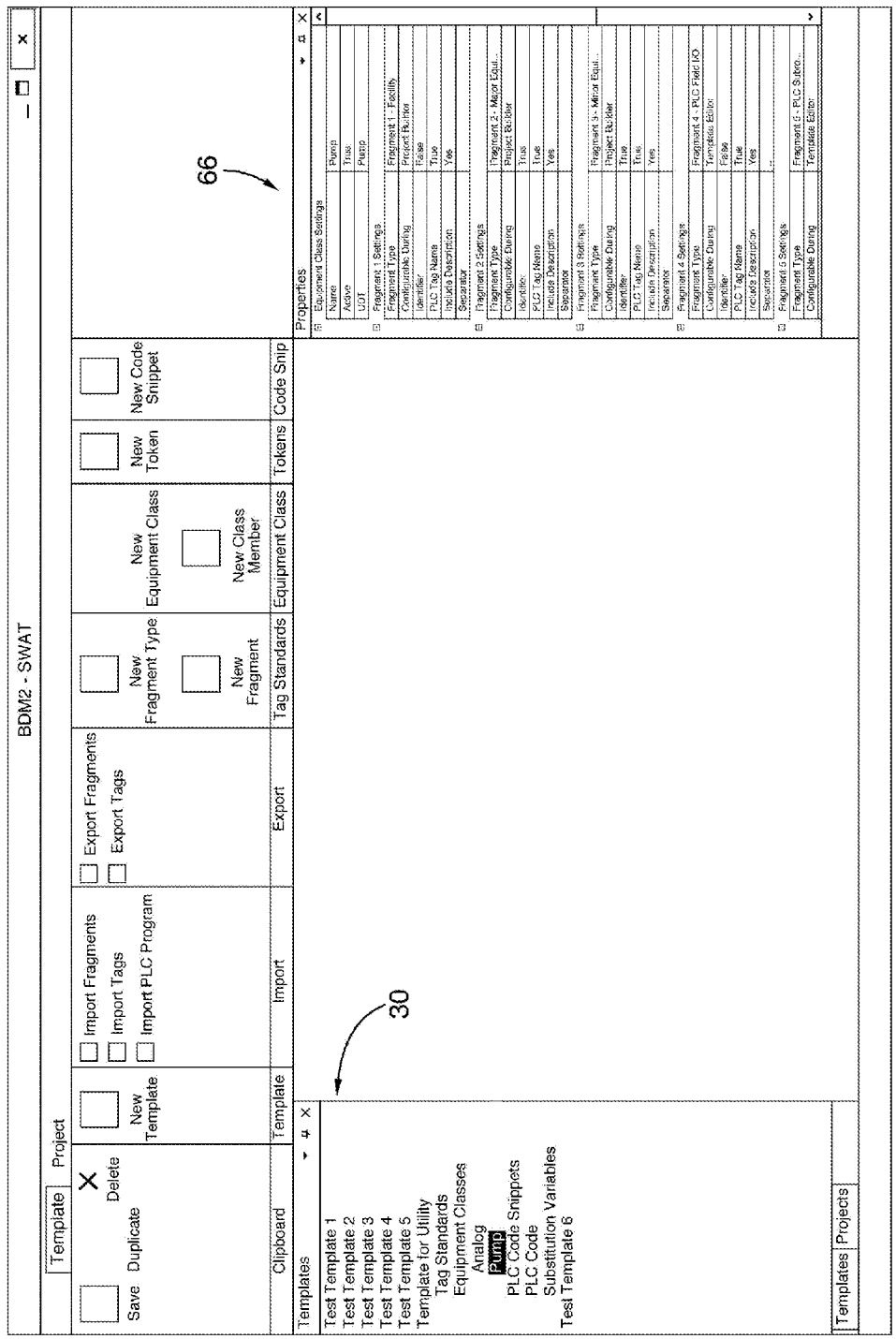
FIG. 14 is a view of the screen of a computer specially adapted to carry out a method according to an exemplary embodiment of the invention, in use

Thereafter, the user must set the properties for the class. This is done by selecting the class in the clipboard 30, which activates the properties area 66, as indicated in FIG. 14, wherein the properties of Equipment Class "pump" are shown.

Figure 15:
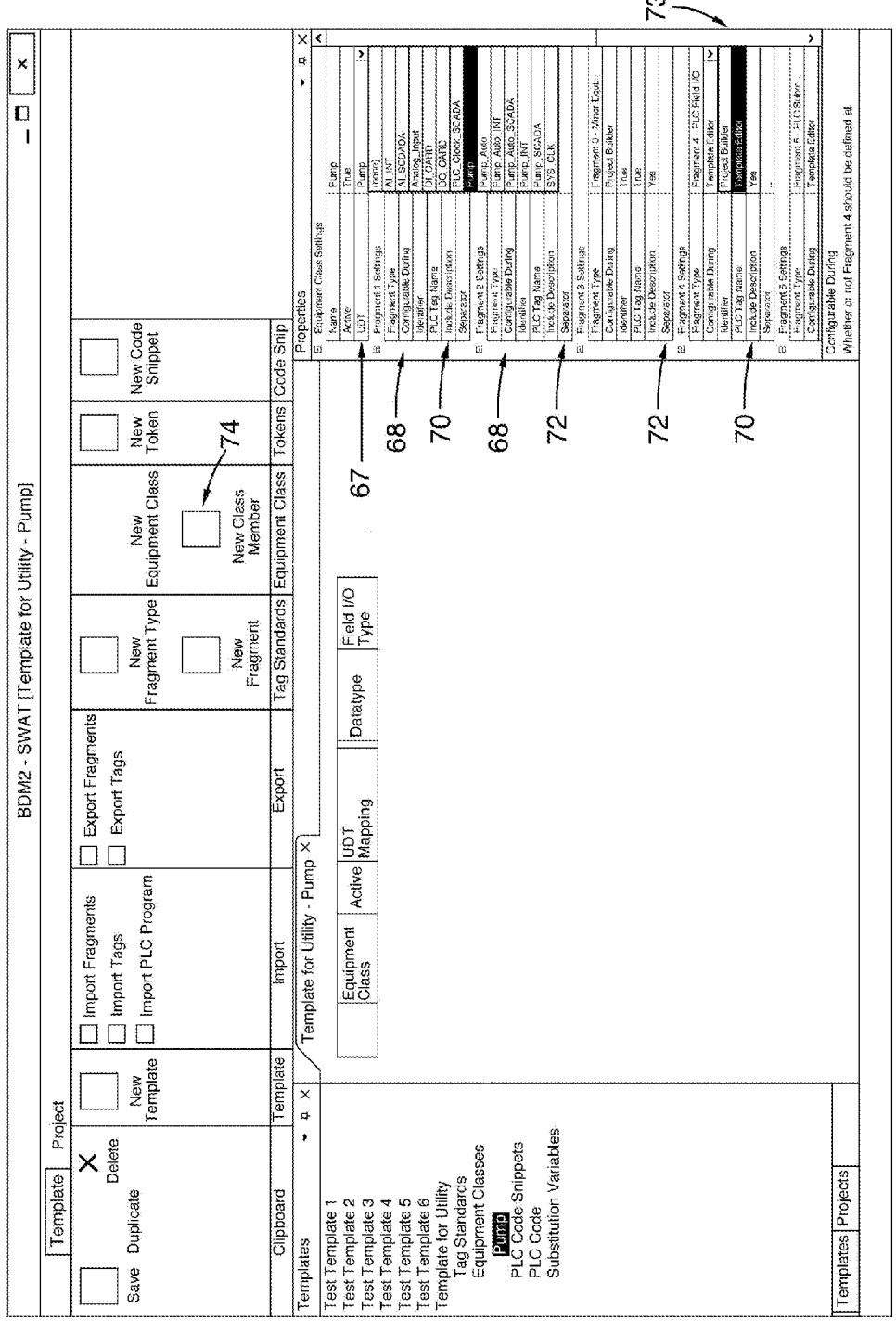
FIG. 15 is a view of the screen of a computer specially adapted to carry out a method according to an exemplary embodiment of the invention, in use

Thereafter, the user:
  binds an appropriate UDT from the imported PLC program; as indicated in FIG. 15, the file "pump" is bound to the equipment class "pump", indicated by arrow 67; and
  configures each fragment, specifically:
    indicates if each fragment is configured within the template builder or the project builder, as indicated by arrows 68
    indicates if the description for this fragment is to be included when tags for equipment of this class are created, as indicated by arrows 70
    indicates if a separator is to be included for this fragment when tags for equipment of this class are created, as indicated by arrows 72.

In FIG. 15, for example, Fragment 4—PLC is indicated to be created in the template editor, as indicated by arrow 73.

Further steps in the exemplary template creation process involve the population of each class with class members and setting HMI tag properties.

To populate a class with members, the appropriate class must be selected in the clipboard, and thereafter, the New Class Member icon 74 is selected.

Figure 16:
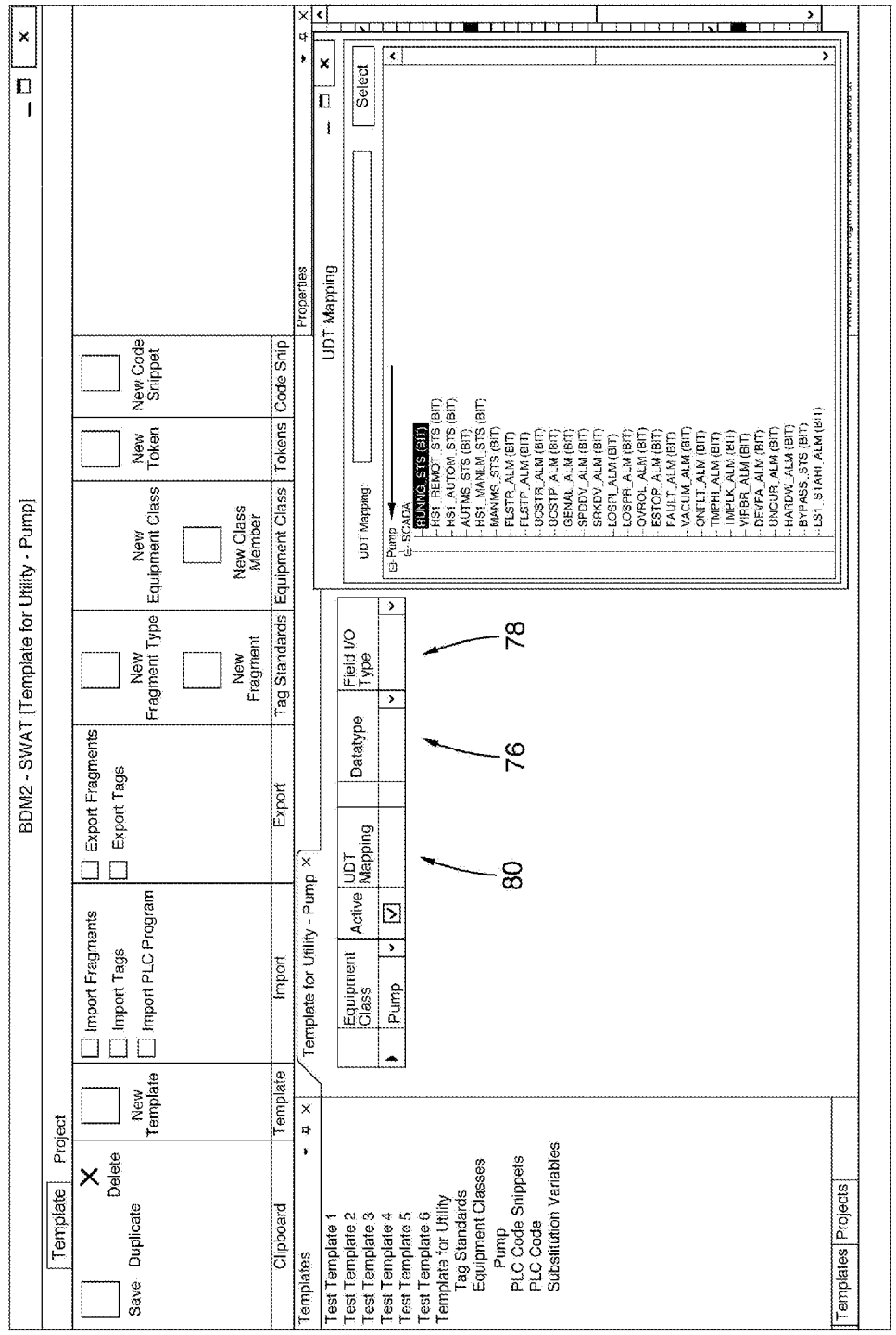
FIG. 16 is a view of the screen of a computer specially adapted to carry out a method according to an exemplary embodiment of the invention, in use
Figure 19:
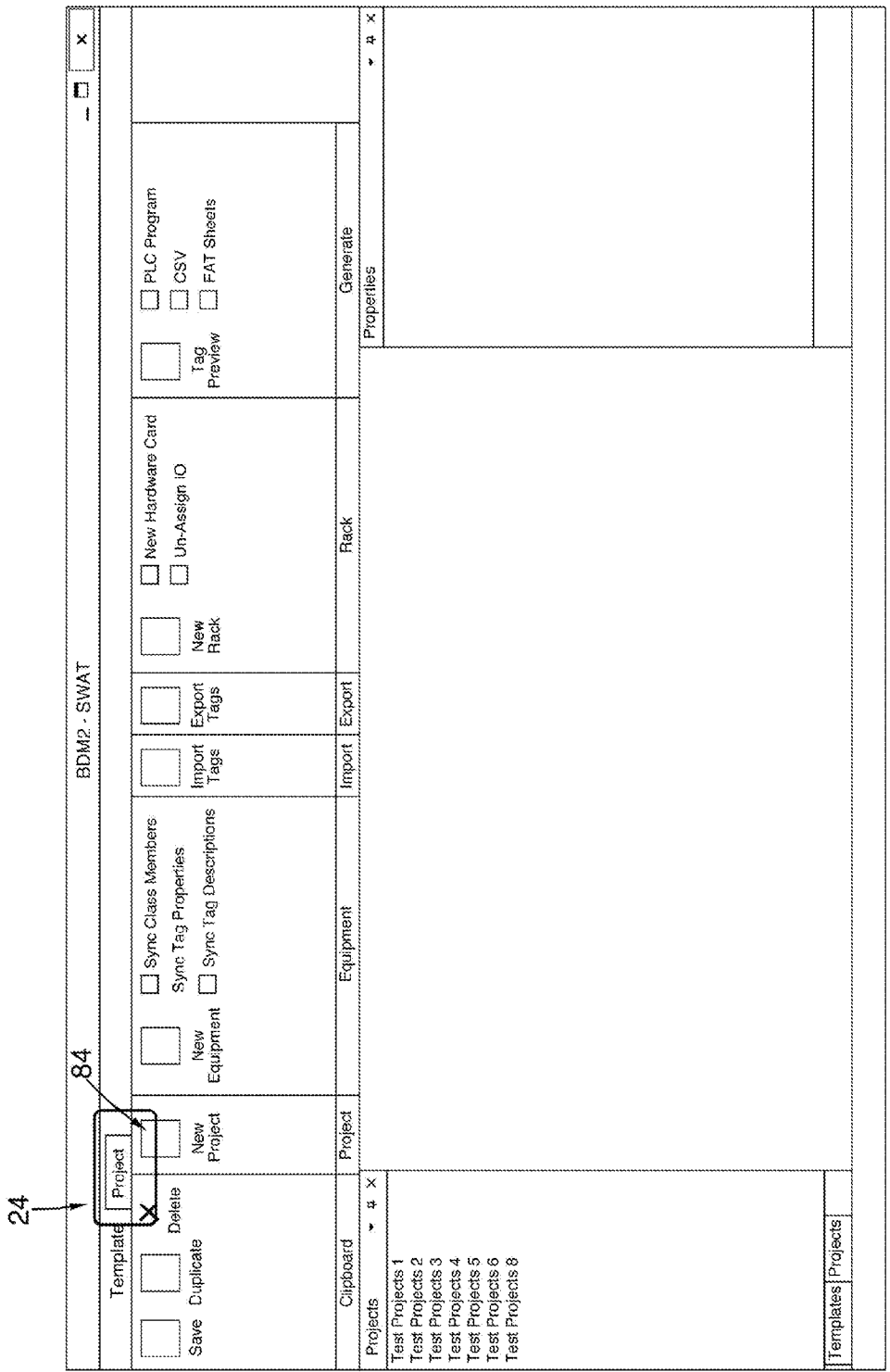
FIG. 19 is a view of the screen of a computer specially adapted to carry out a method according to an exemplary embodiment of the invention, in use

Creation of a new class member opens a data entry screen which provides for user entry of information into a Datatype Dropdown 76, Field I/O Type Dropdown 78 and UDT Mapping dropdown 80, as shown in FIG. 16.

The Datatype Dropdown 72 allows the user to select from various datatypes, i.e. discrete, etc.

The Field I/O Type Dropdown 78 allows the user to select from various predefined Field I/O types, i.e. Digital Alarm, Digital Input, etc.

The UDT Mapping dropdown 80 allows the user to select an element, from the previously selected UDT file, to be associated with the class member. In FIG. 16, RUNNG_STS (BIT) is shown being bound to class "pump".

Figure 17:
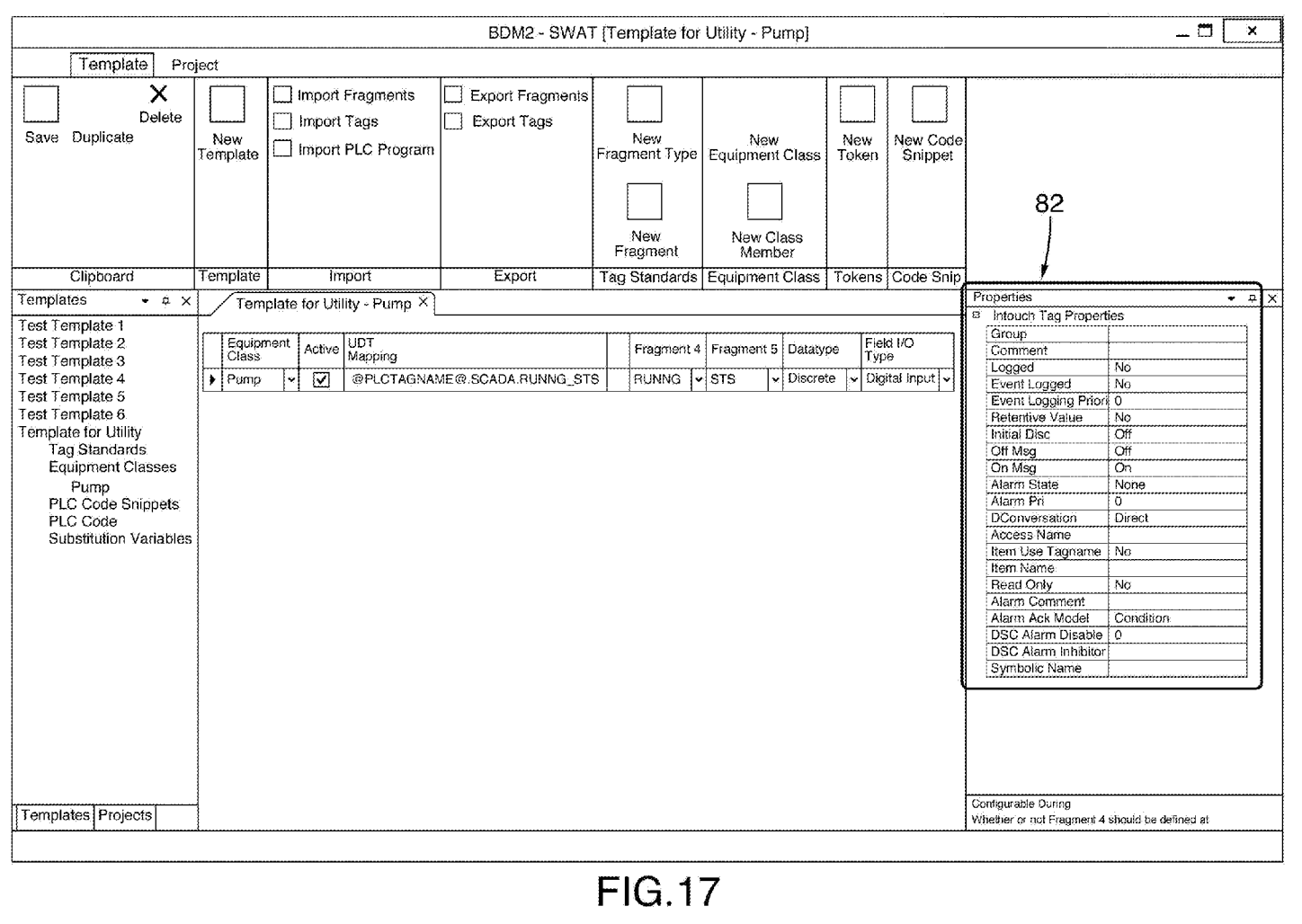

The final step in the creation of a class member is assignment of SCADA/HMI Tag Properties to the member, by appropriate toggling of variables in a Property Table 82 associated with the member, as shown in FIG. 17.

Figure 18:
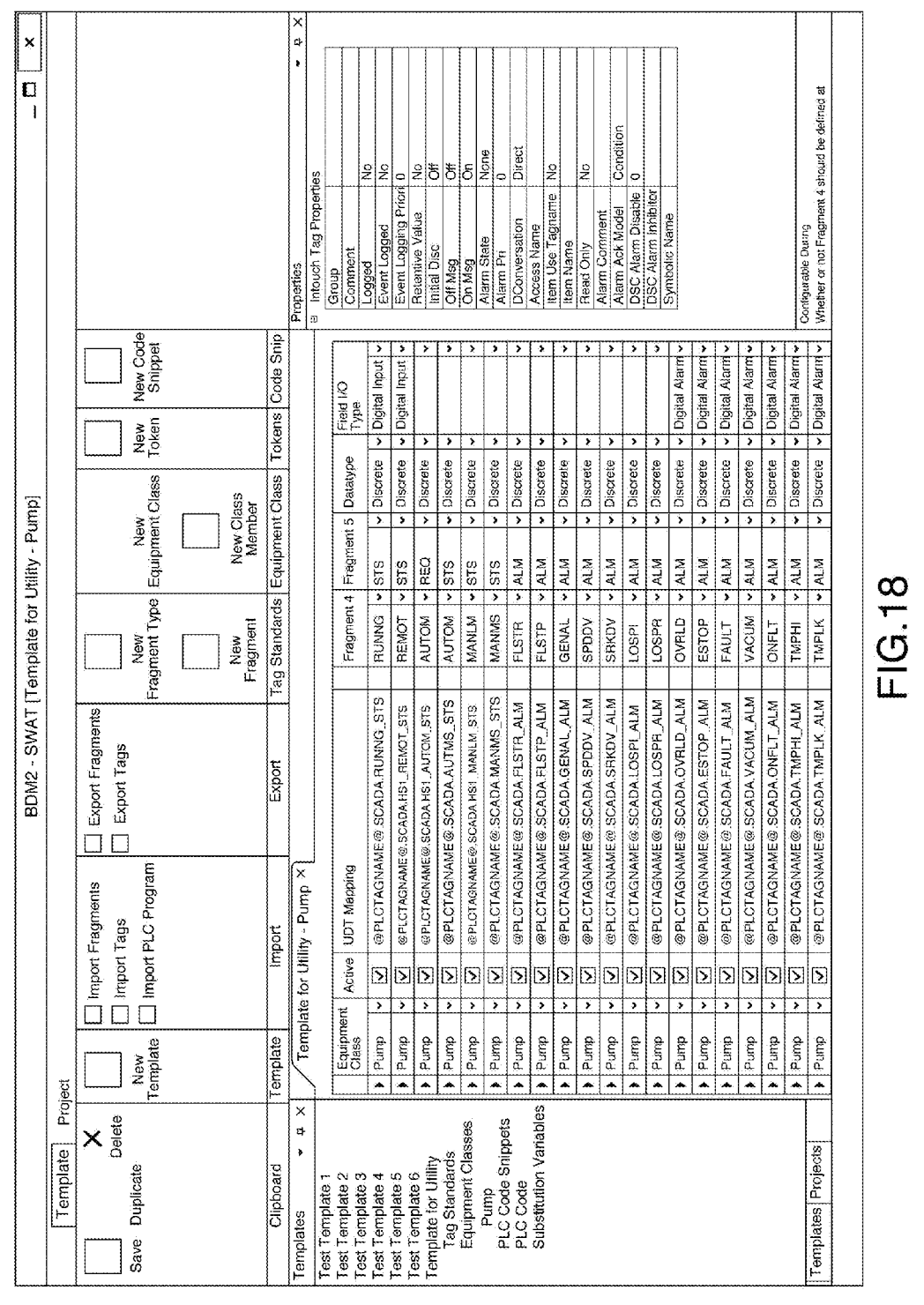

This step is created until all class members have been added; FIG. 18 shows an exemplary result, wherein a plurality of members have been assigned to class "pump".

The population of all classes with members results in a template that can be used in the project builder functionality.

Project Builder

Figure 23:
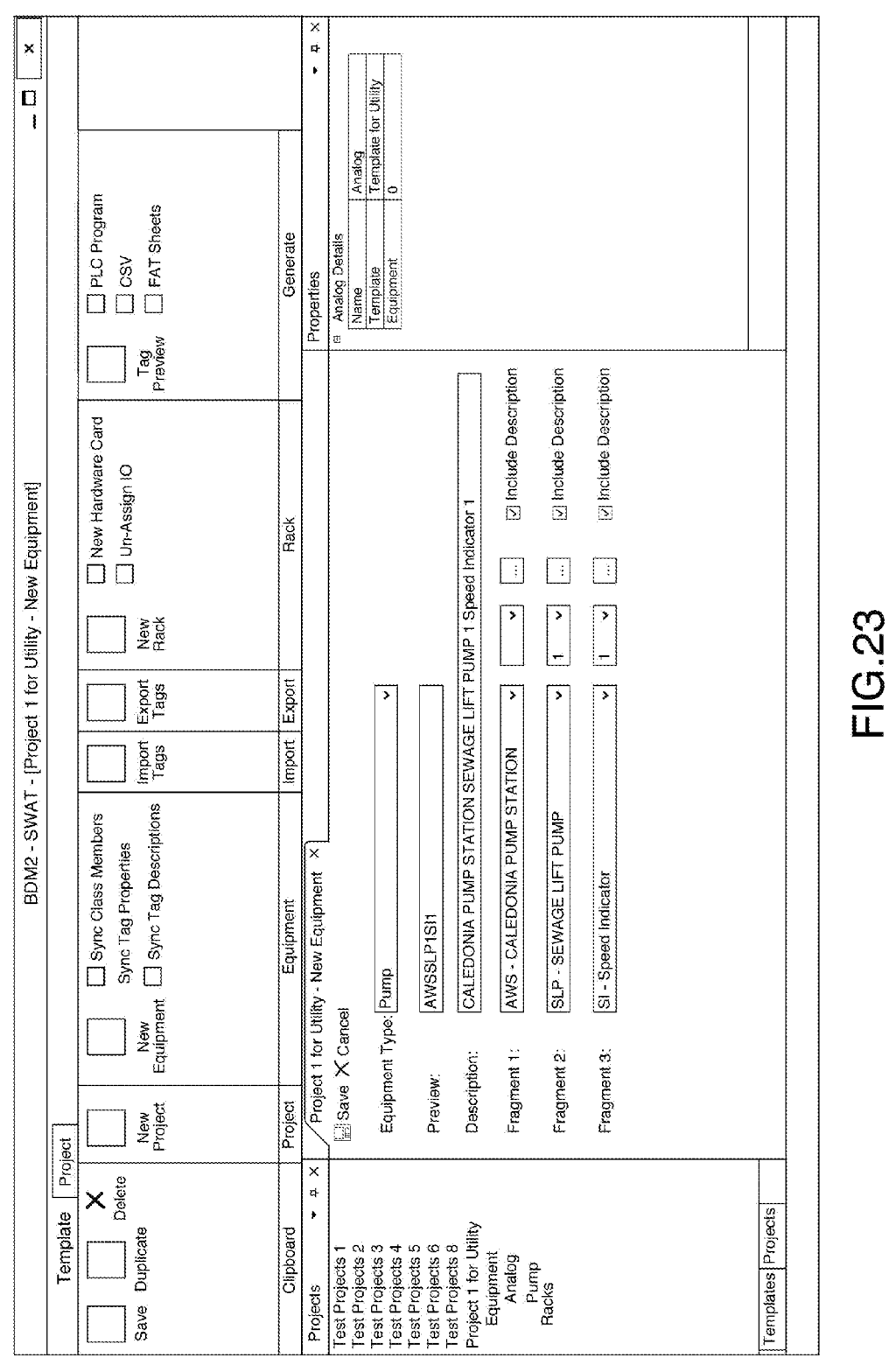

Creation of a PLC tag database, PLC code and associated HMI tag database and Factory Acceptance Test sheets for a project commences with activation of the project builder functionality, by selection of the Project icon 24, as indicated by FIG. 23.

Thereafter, an initial step involves the selection of a name and a selection of the appropriate template.

Figure 20:
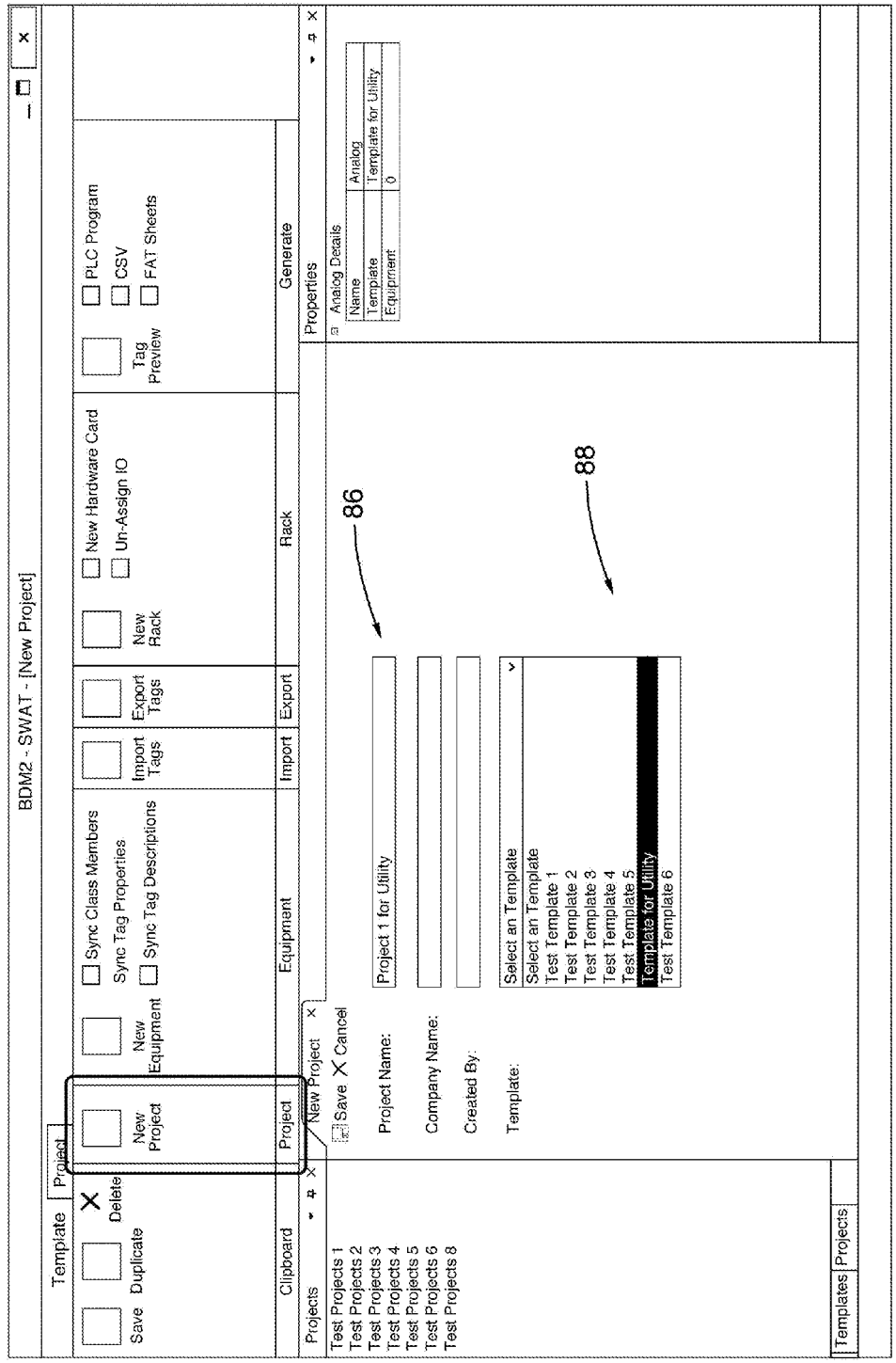
FIG. 20 is a view of the screen of a computer specially adapted to carry out a method according to an exemplary embodiment of the invention, in use FIG. 21 (FIG. 21A and FIG. 21B) is a view of the screen of a computer specially adapted to carry out a method according to an exemplary embodiment of the invention, in use

This is done via selection of the New Project icon 84, which opens a text entry screen that allows for a suitable entry in a Project Name text entry box 86 and a suitable selection from a Template selection dropdown 88, as shown in FIG. 20, wherein the template "Template for Utility" has been selected for the project "Project for Utility".

Creation of a project places the name of the project into the Clipboard for future work.

Figure 21A:
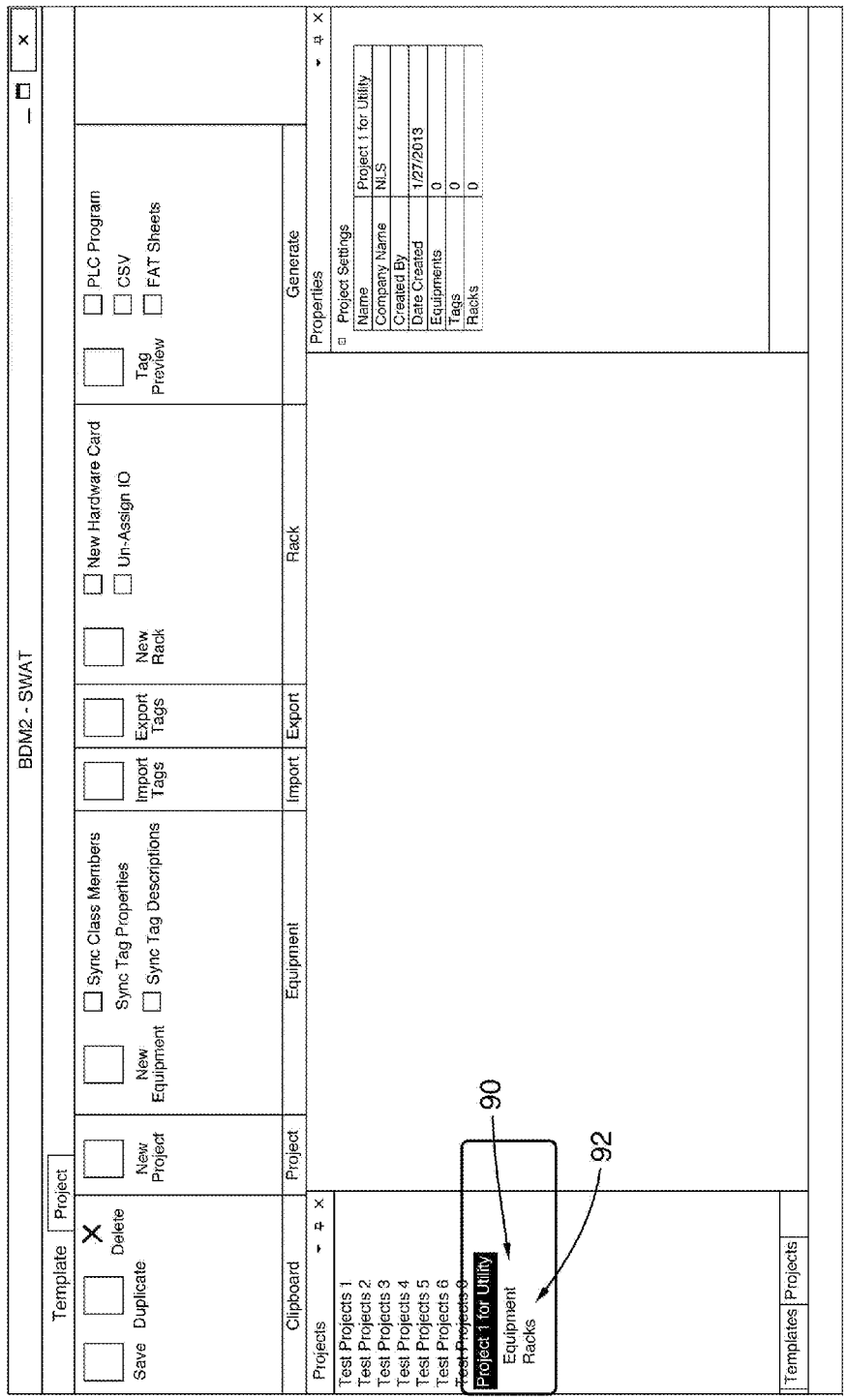

Selection of a project from the Clipboard expands the project into Equipment 90 and Racks 92 buttons, as shown in FIG. 21A.

Equipment Creation

Figure 21B:
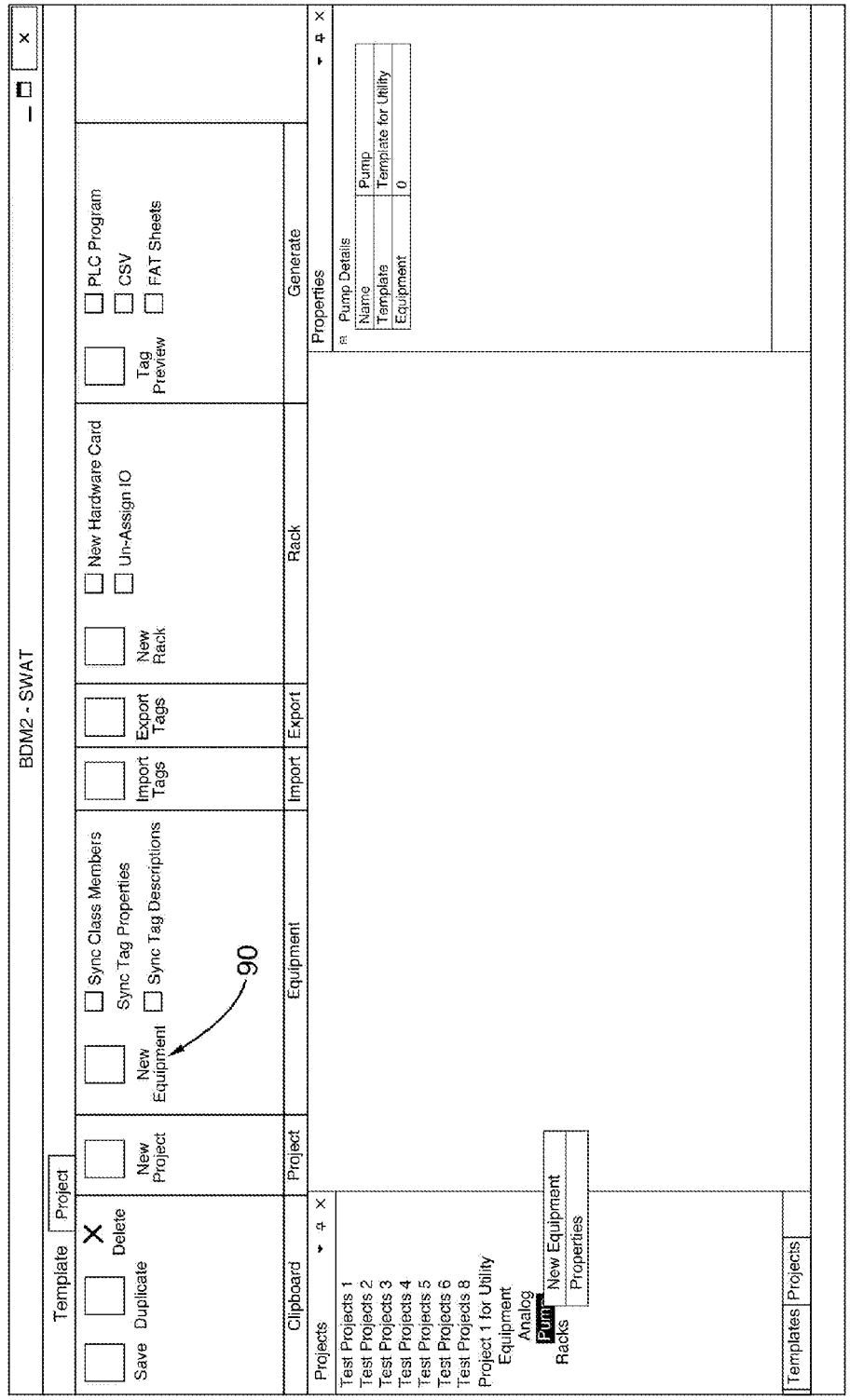

Selection of the Equipment button 90 expands the Equipment heading into subheadings for each class of equipment that is included within the template, which, in the case of FIG. 21B, includes the classes "analog" and "pump".

From this page, the user adds pieces of equipment to the project definition by selecting the equipment class and the New Equipment button 90.

Figure 22:
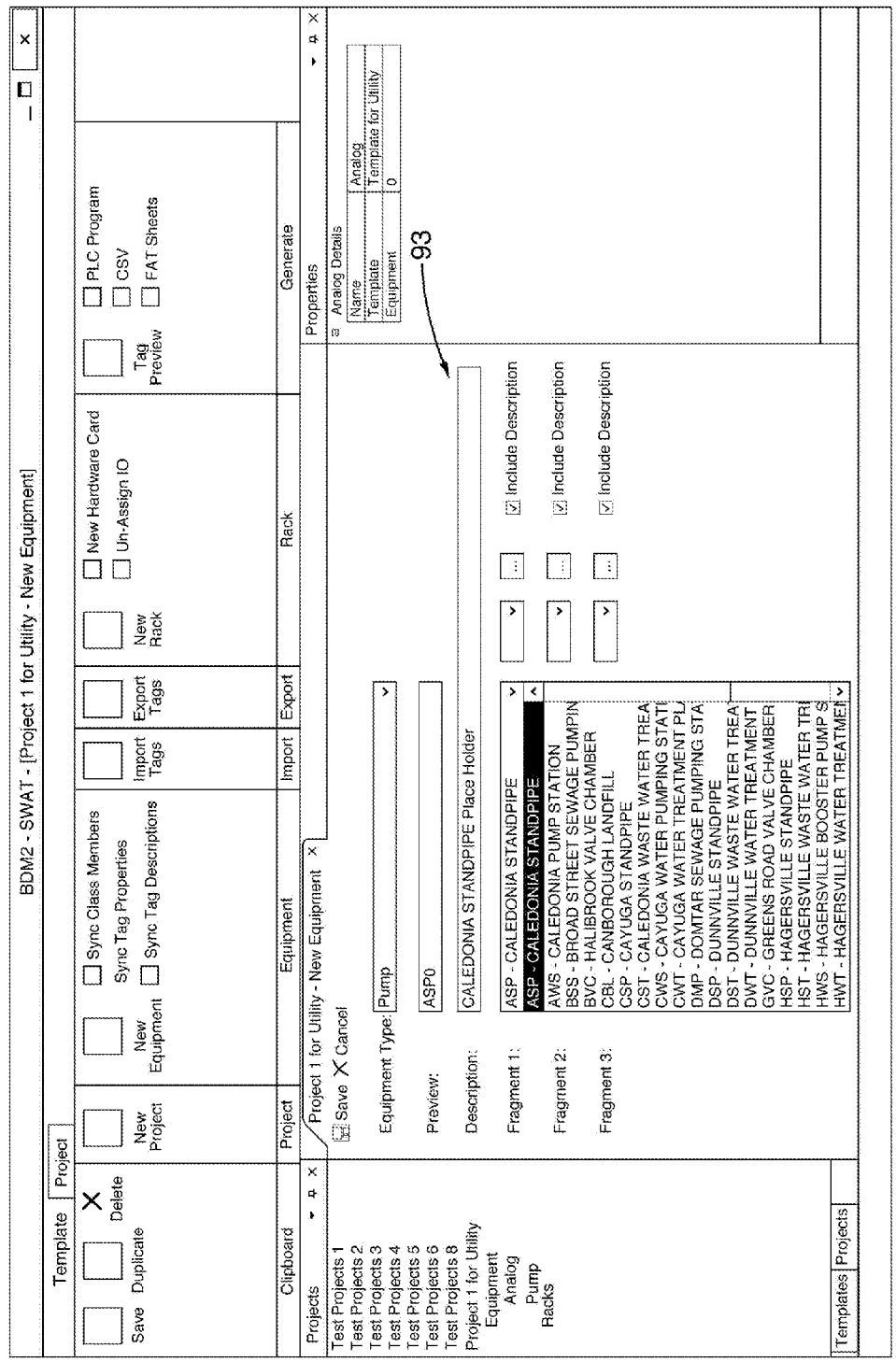
FIG. 22 is a view of the screen of a computer specially adapted to carry out a method according to an exemplary embodiment of the invention, in use

As each piece of equipment is added, a data entry screen is generated, as seen in FIG. 22, wherein the user is prompted to enter a description for the piece of equipment in a Description text entry box 93, and is prompted to select values for the fragments that are not defined in the template.

With reference to FIG. 22, the template provided no definitions for Fragments 1-3 and the user is therefore prompted to select values for the same based upon the values available therefor in the template, the result being shown in FIG. 23.

Addition of a piece of equipment causes a plurality of tag points [defined by the class members, populated in accordance with the project and template descriptions] to created, and similarly causes the HMI tags to be bound to a PLC tag and the tag fragments [defined by the UDT mapping for each member].

Figure 24:
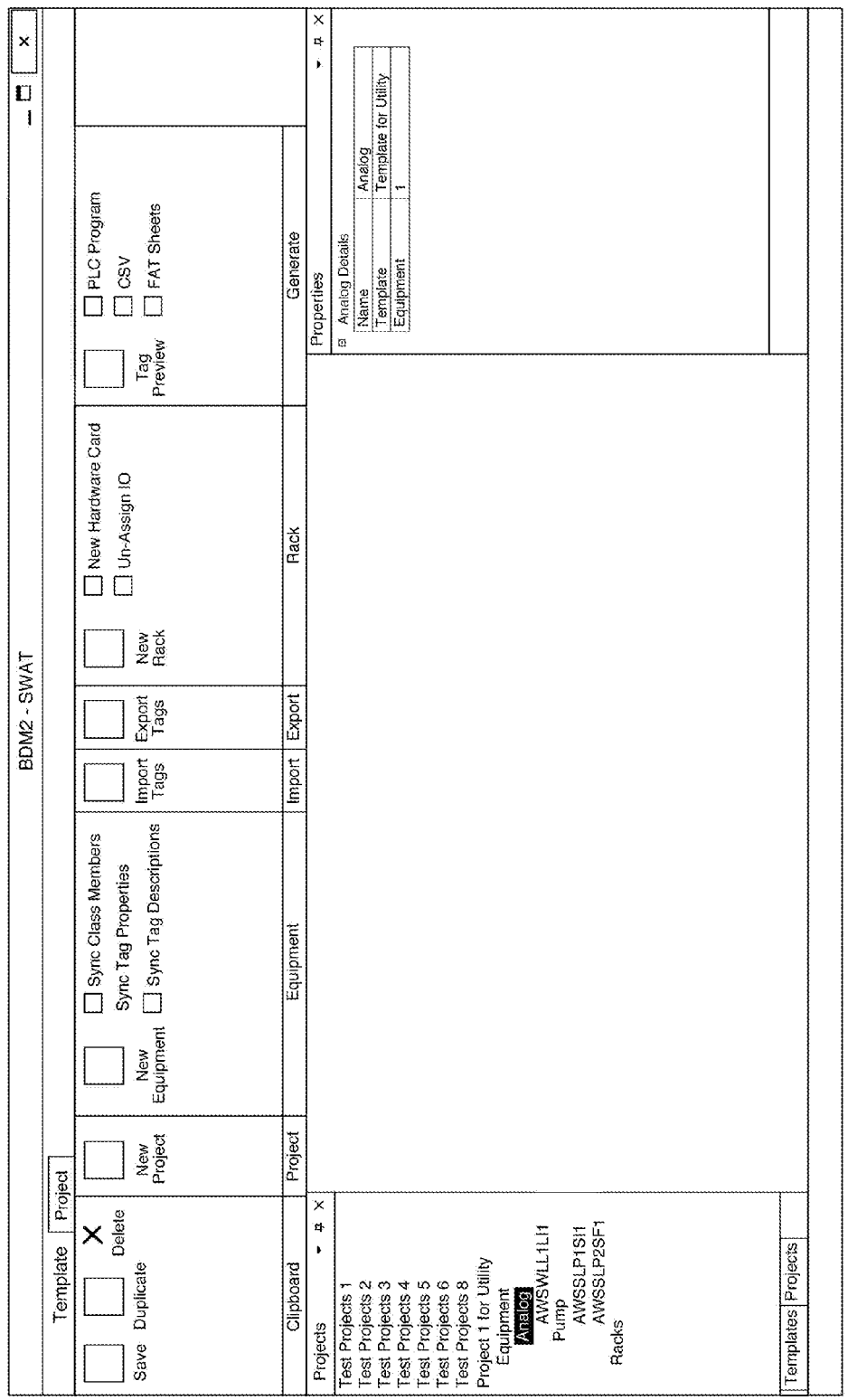
FIG. 24 is a view of the screen of a computer specially adapted to carry out a method according to an exemplary embodiment of the invention, in use

These steps are repeated until all of the pieces of equipment required for the project have been created. FIG. 24 shows a project having two pumps, having the tag names AWSSLP1S11 and AWSSLP2SF1, and an analog device, AWSLL1LJ1.

Rack Layout

The penultimate task in a project build involves building a rack and card inventory.

Figure 25:
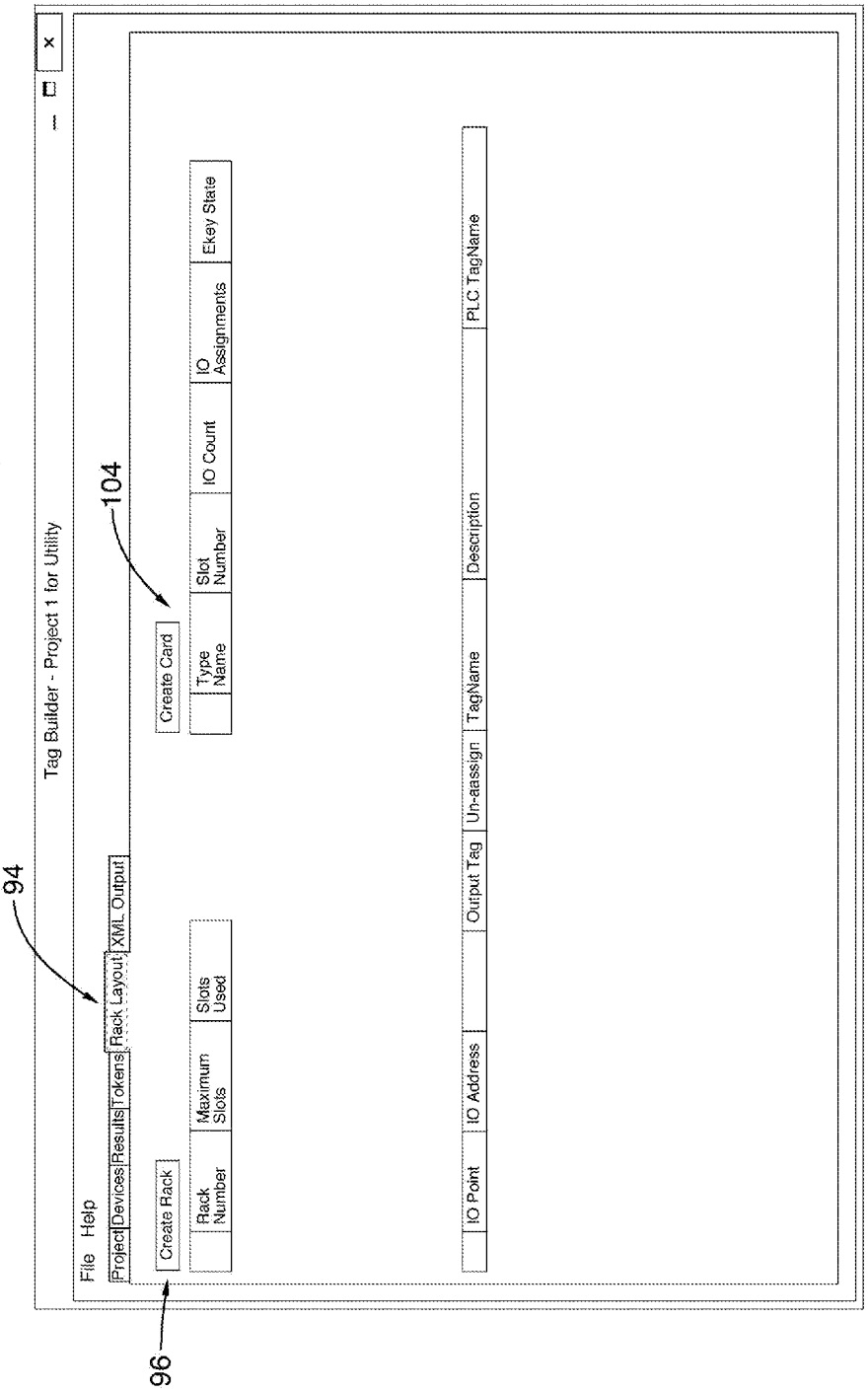
FIG. 25 is a view of the screen of a computer specially adapted to carry out a method according to an exemplary embodiment of the invention, in use

This functionality is accessed by selecting the Rack Layout button 94, as indicated in FIG. 25.

Figure 26:
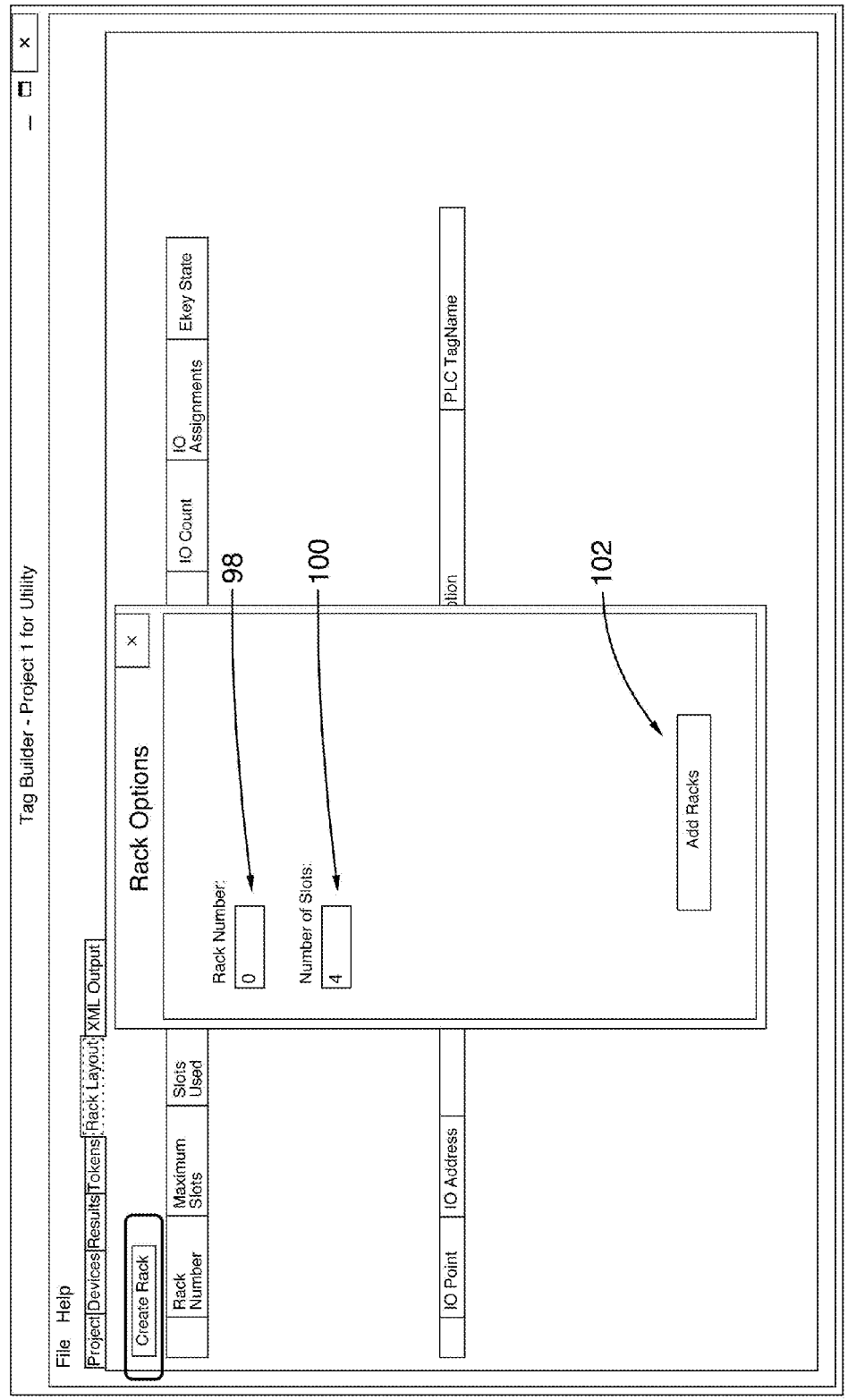
FIG. 26 is a view of the screen of a computer specially adapted to carry out a method according to an exemplary embodiment of the invention, in use

Racks can then be added to the project by selection of the Create Rack button 96, making suitable entries into the Rack Number text entry block 98 and Number of Slots text entry block 100 and selecting the Add Rack button 102, as indicated by FIG. 26

Figure 27:
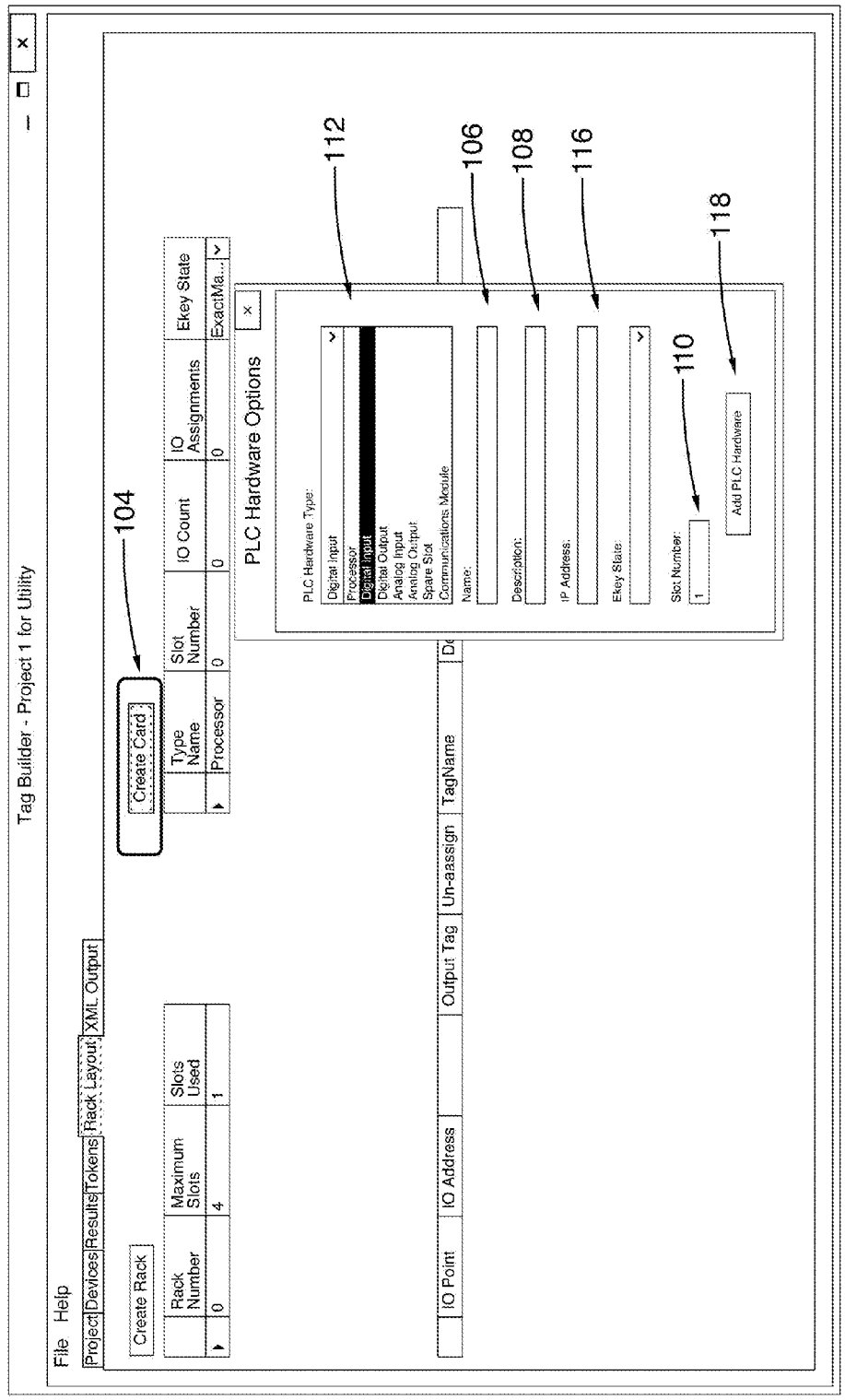
FIG. 27 is a view of the screen of a computer specially adapted to carry out a method according to an exemplary embodiment of the invention, in use

Cards are added to the project, as indicated by FIG. 27, by:
  selection of the Create Card button 104
  making a suitable entry into the Name text block 106
  making a suitable entry in the Description text entry block 108
  making a suitable entry in the Slot Number text entry block 110;
  choosing the card type from the PLC Hardware Type drop down 112;
  optionally making a suitable entry into the IP Address 116; and
  selecting the Add PLC Hardware button 118.

Figure 28:
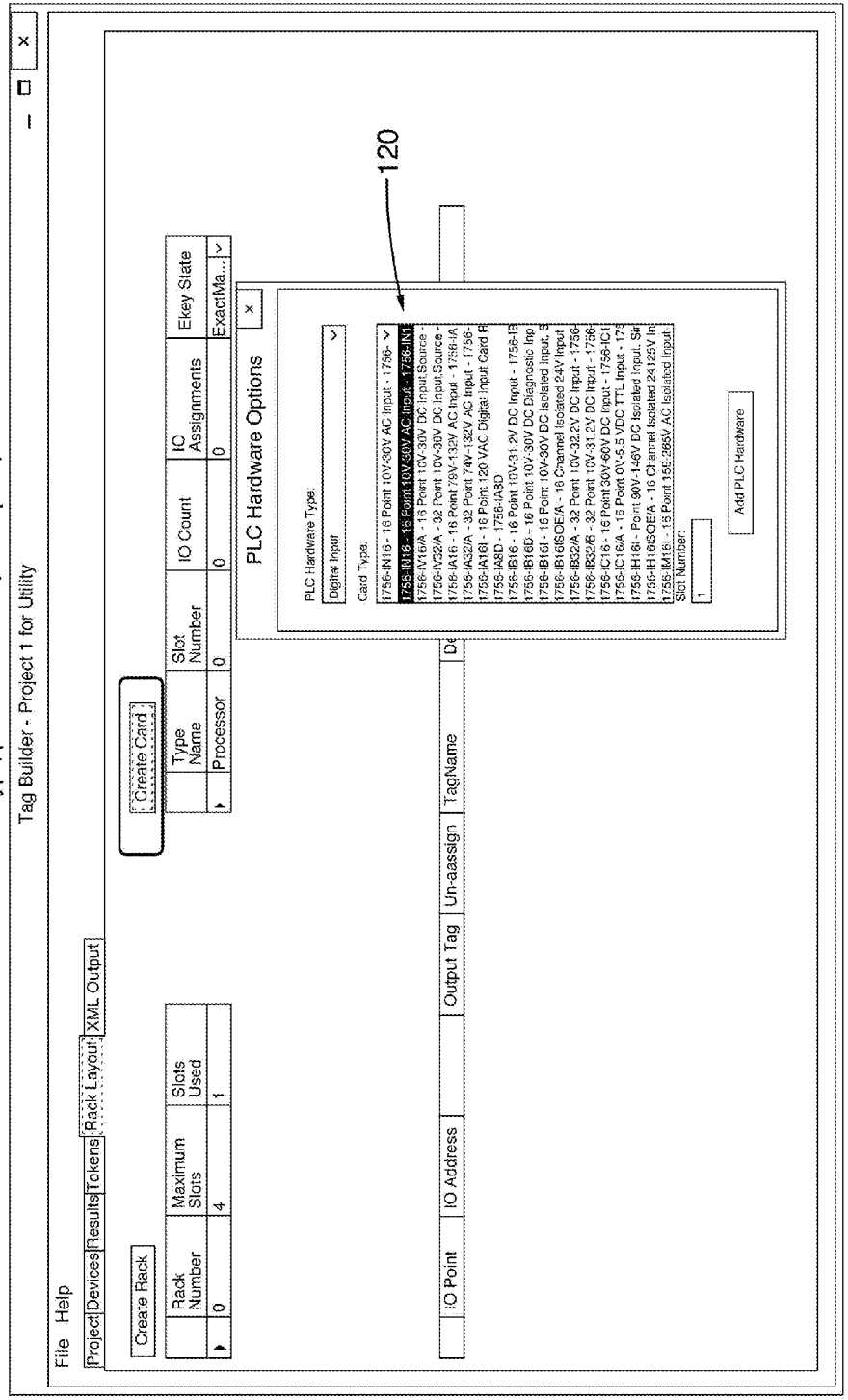
FIG. 28 is a view of the screen of a computer specially adapted to carry out a method according to an exemplary embodiment of the invention, in use

It will be understood that the program includes specifications for popular PLC cards, as shown by dropdown 120 in FIG. 28, and automatically creates the appropriate number of wiring points in the dataset as each card is added.

Figure 29:
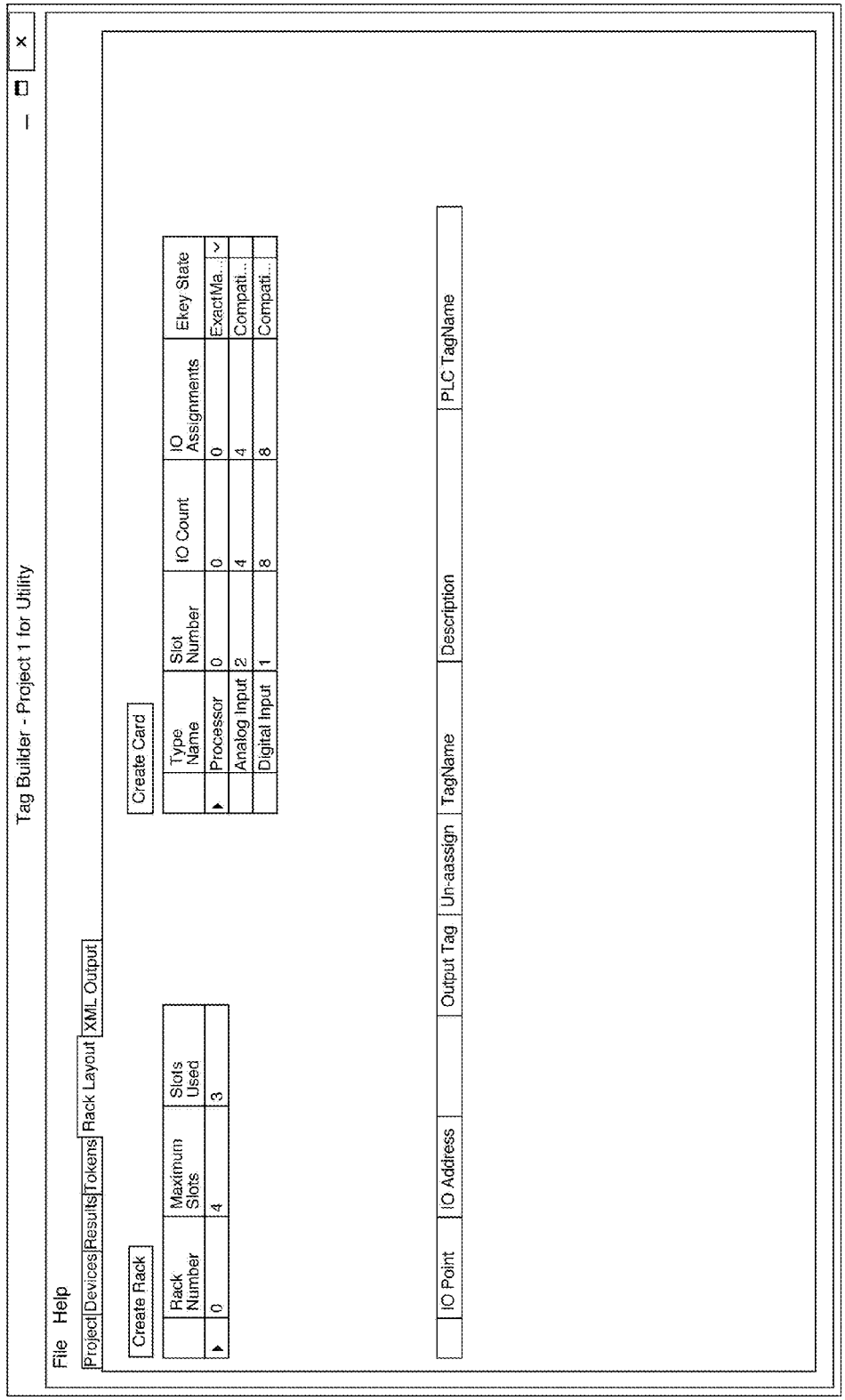
FIG. 29 is a view of the screen of a computer specially adapted to carry out a method according to an exemplary embodiment of the invention, in use

FIG. 29 shows exemplary results of this process: in the "Project 1 for Utility" project, a single rack has been created [Rack 0] and three cards have been created therein, a processor in Slot 0, an analog input card in Slot 2 and a Digital Input card in Slot 1.

Wiring

The final step in the process is to assign the physical device inputs and outputs to wiring points. This is done, for each card, by selecting the card, and assigning to each available wiring point on the card [rack and slot], one of the available tag points that can be wired in. This is done in accordance with the requirements of the project, i.e. normally in accordance with a predetermined design drawing.

Figure 30:
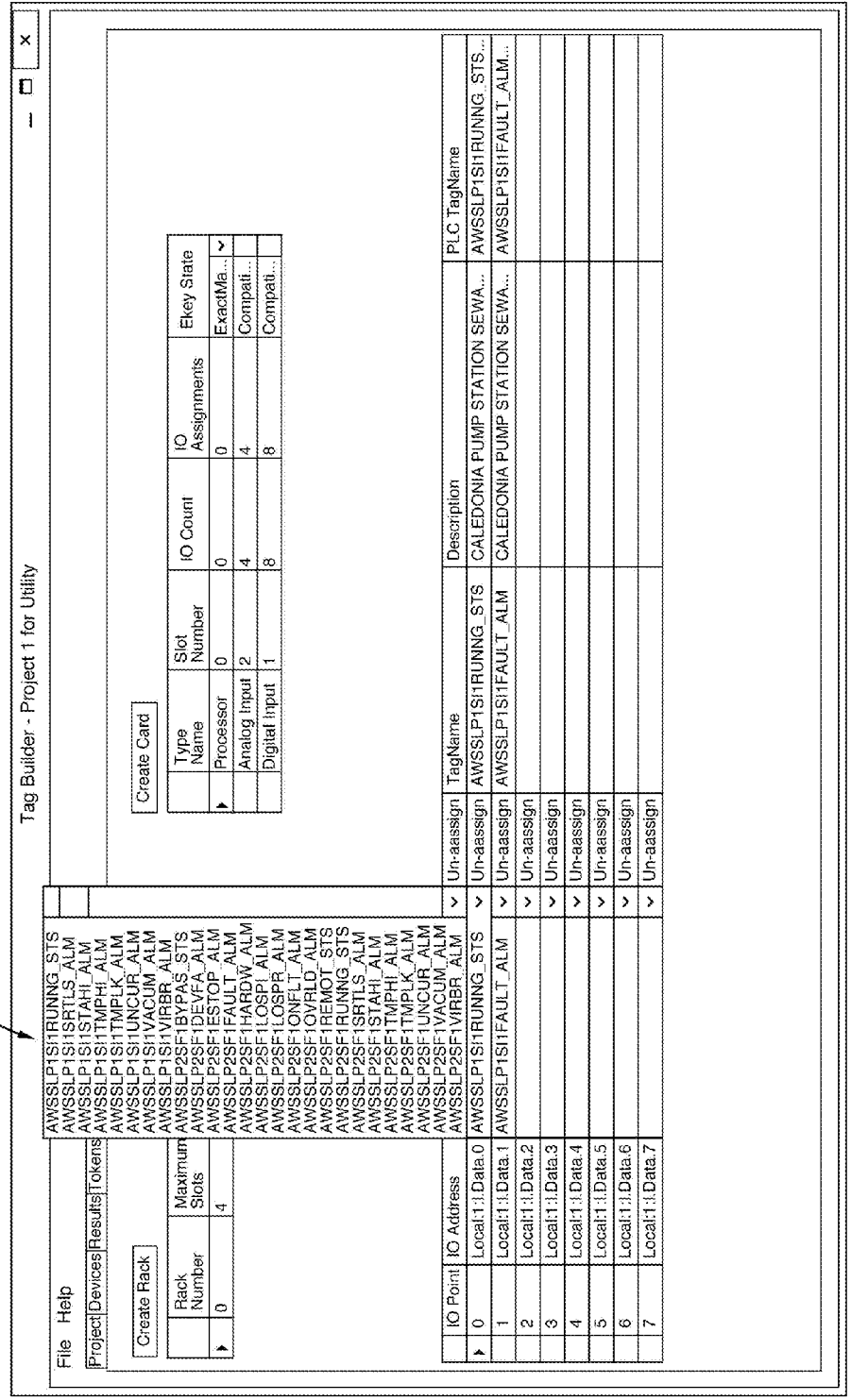
FIG. 30 is a view of the screen of a computer specially adapted to carry out a method according to an exemplary embodiment of the invention, in use

FIG. 30 shows, by way of example, Tag AWSSL1S/1RUNNG_STS being assigned to Point 0 of a digital input card in Rack 0, Slot 1 and AWSSLP1SI1FAULT_ALM being assigned Point 1 of the same card. Arrow 122 in FIG. 30 shows a dropdown including the available tag points that can be wired into the wiring point. It should be understood that the content of this dropdown is context dependent and also inventory dependent: if the I/O type of a member [tag point] is set to "Digital Input", it will show up as a dropdown option only when the user is choosing a digital input point. Thus, when the user is choosing a digital output, analog input, or analog output, this point will not be visible; as well, once this point has been selected, it will be removed from the list, so as to avoid the possibility of a physical point being wired into two locations.

Code Generation

Figure 31:
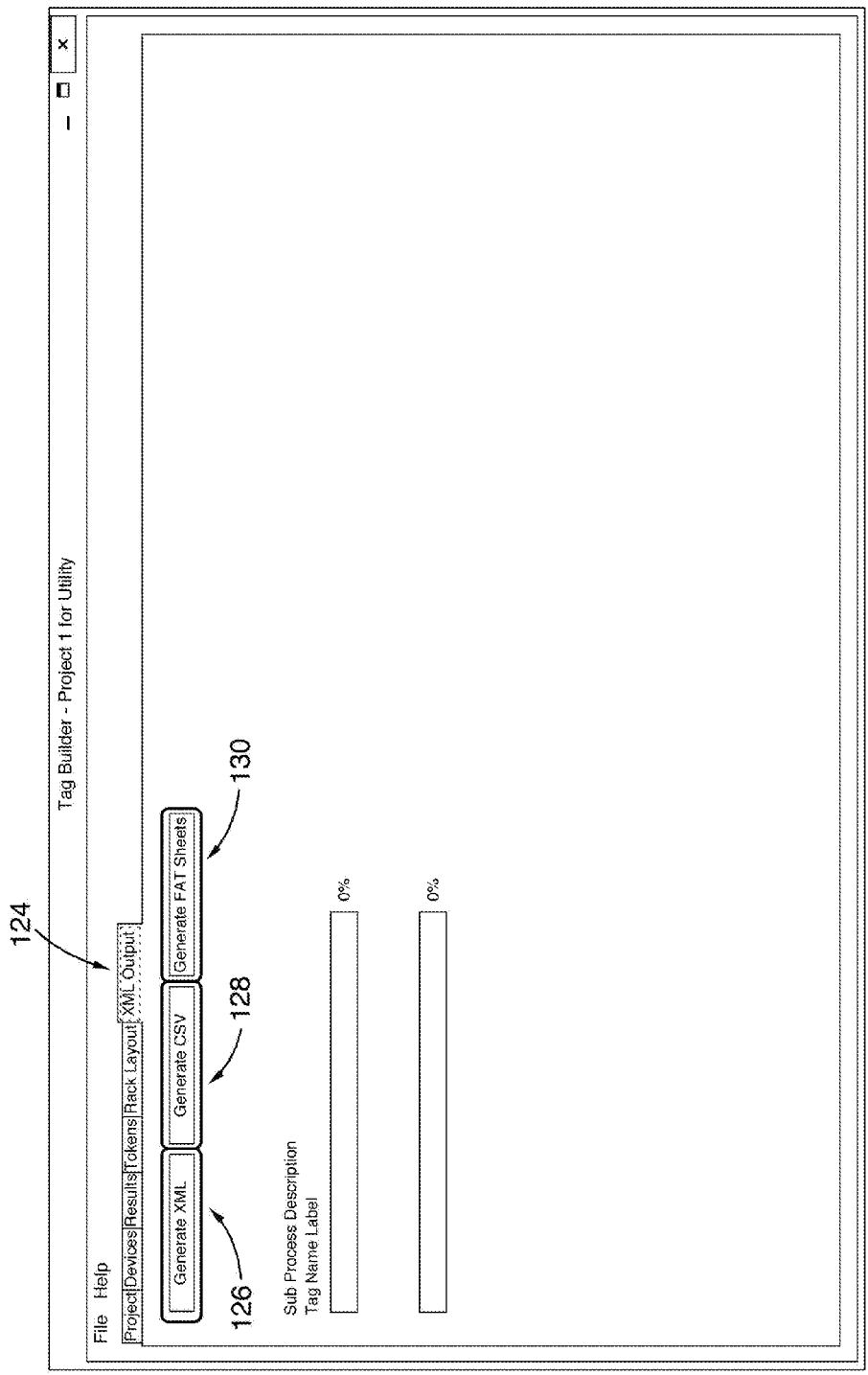
FIG. 31 is a view of the screen of a computer specially adapted to carry out a method according to an exemplary embodiment of the invention, in use

Once all of the inputs and outputs have been assigned, the project build is complete and ready for output; the user need merely, as indicated by FIG. 31, activate the appropriate functionality of the software by selecting the XML Output button 124:
  select the Generate XML button 126 to create the PLC Tag Database;
  select the Generate CSV button 128 to create the c,s,v file in a format suitable for reading by the SCADA/HMI database
  select the Generate FAT Sheets button 130 to create Factory Acceptance Sheets for documentation It will be evident that the above provides substantial utility, in that it allows for the accurate creation of a large number of tags in a relatively quick manner, thereby reducing the amount of programming required with the project. Programming is still, of course, required, to deal with the specifics of the project. However, the invention also allows for methodology that can further reduces programming.

Code Snippets

One of these additional labour-saving features is associated with the optional creation of user-defined code snippets within the template, each snippet having an associated substitution rule and associated trigger.

Figure 32:
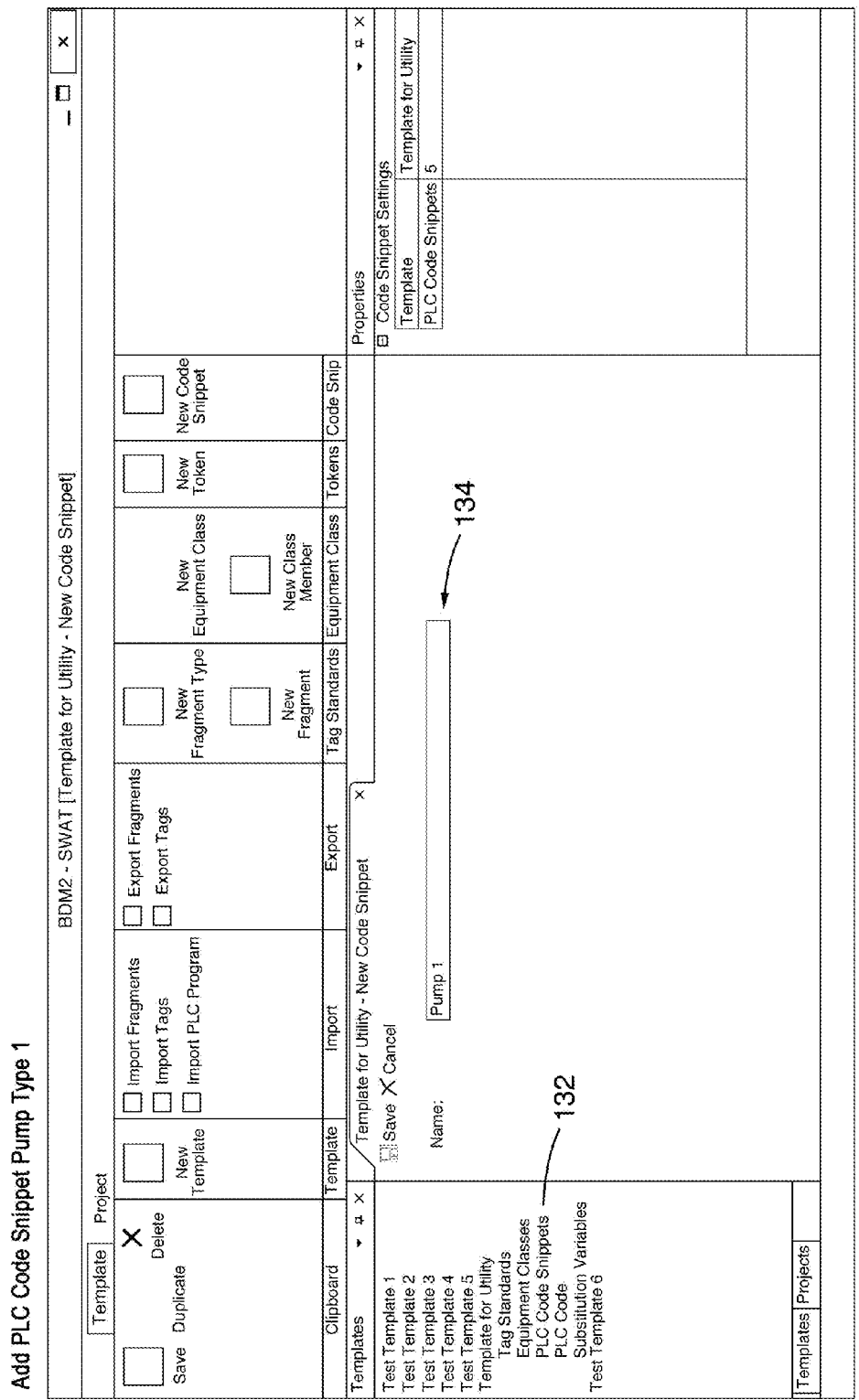
FIG. 32 is a view of the screen of a computer specially adapted to carry out a method according to an exemplary embodiment of the invention, in use

Creation of a code snippet, which is simply a portion of PLC programming, to wit, a routine, a rung or a tag, commences with selection of PLC Code Snippet button 132 in the Clipboard 30, followed by selection of the New Code Snippet icon 134, as seen in FIG. 32, and entry of a name in Name text entry box 134.

Figure 33:
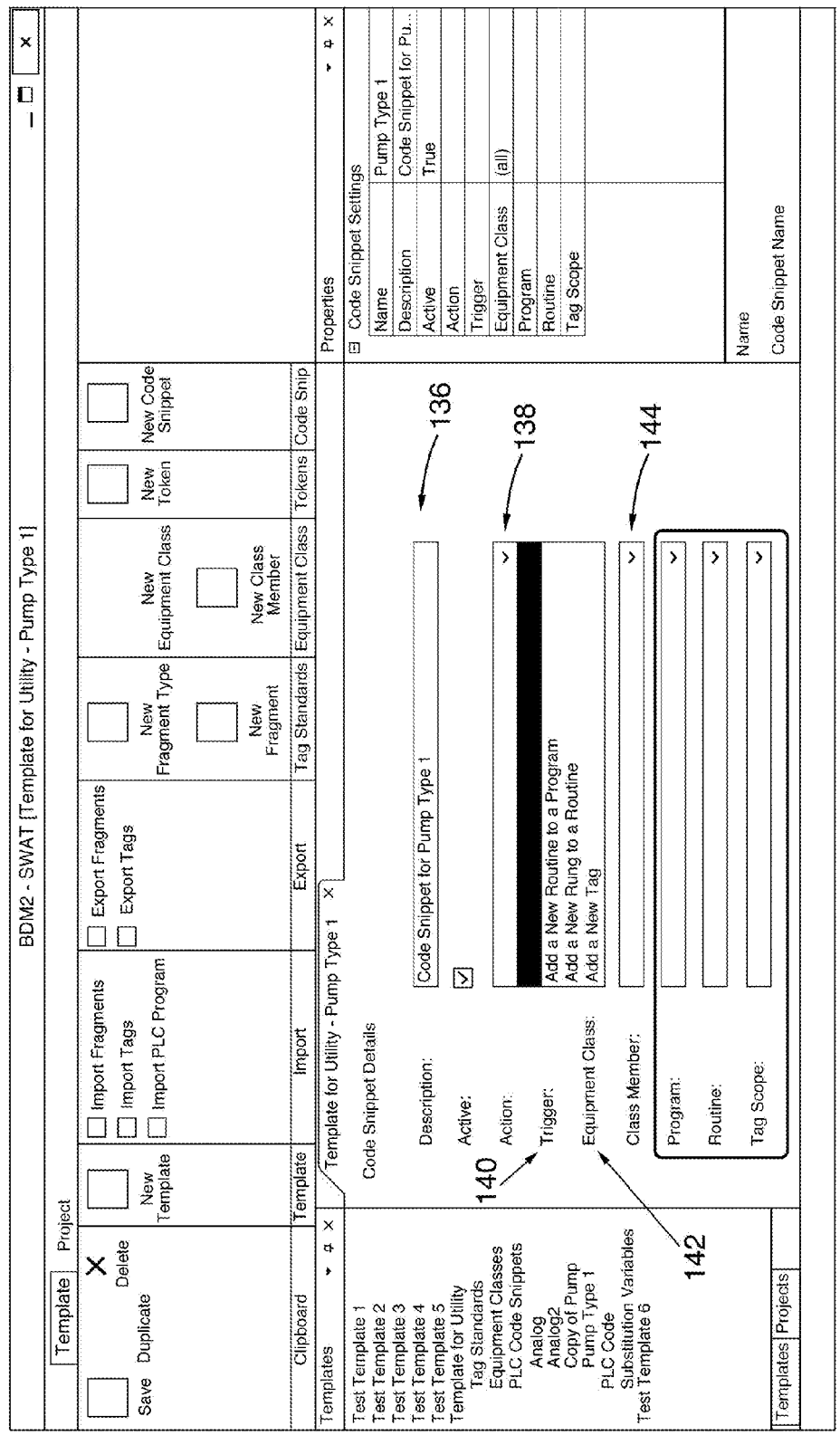
FIG. 33 is a view of the screen of a computer specially adapted to carry out a method according to an exemplary embodiment of the invention, in use

Selection of the name in the Clipboard opens up a text entry template, as suggested in FIG. 33.

FIG. 33 shows the template making provision for the entry, inter alia, of:
  description, in Description text entry box 136
  Action, in Action dropdown 138
  Trigger, in Trigger dropdown 140
  Equipment class, in Equipment Class dropdown 142
  Class member, in Class member dropdown 144

The substitution rule allows for, via toggling of Action dropdown 138:
  the addition of a new routine to a program
  the addition of a new rung to a routine; and
  the addition of a new tag.

Figure 34:
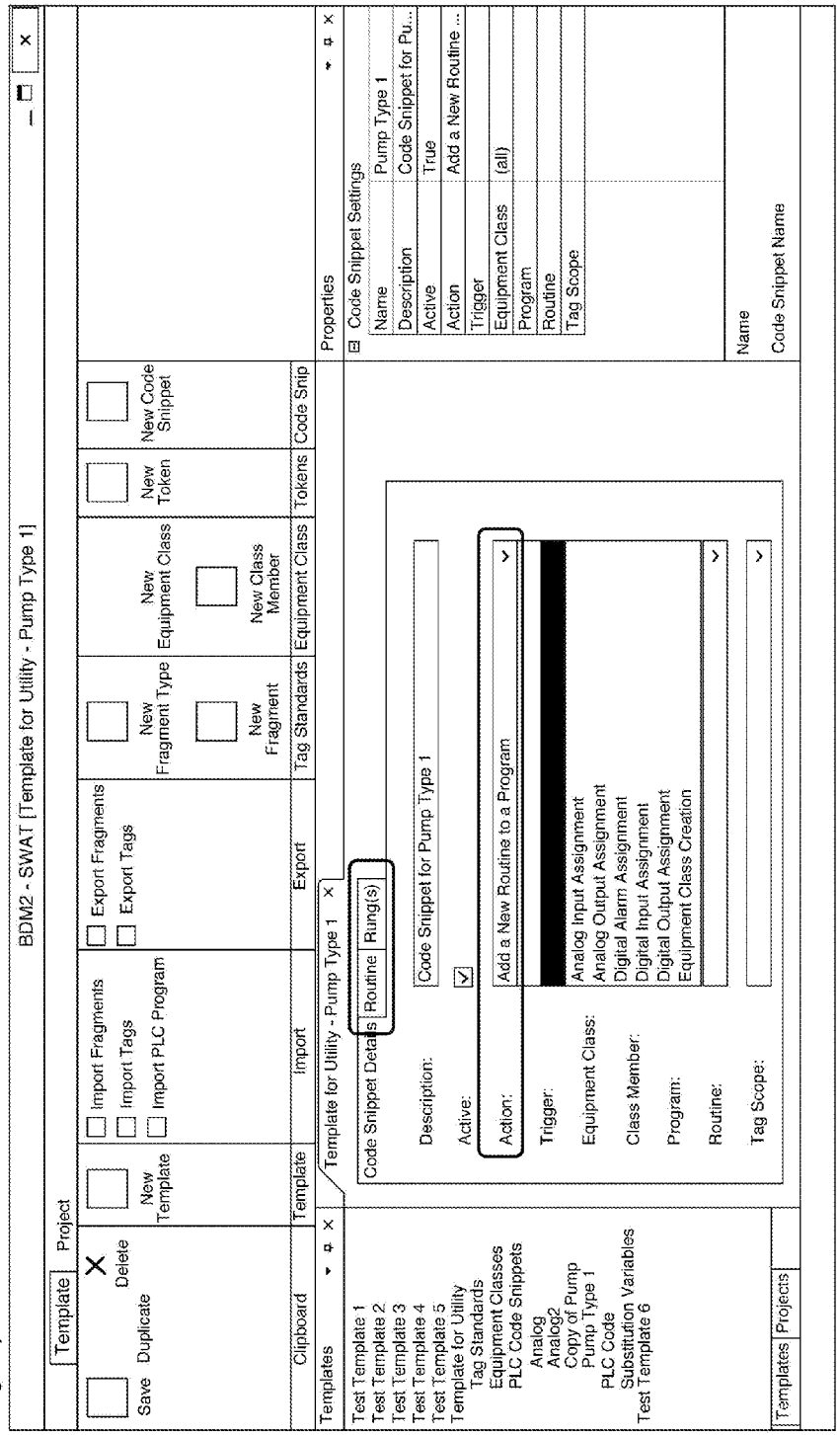
FIG. 34 is a view of the screen of a computer specially adapted to carry out a method according to an exemplary embodiment of the invention, in use

The substitution rule further allows for the Action specified above to be effected at each instance of the trigger, which can be specified, as suggested by FIG. 34, as any of:
  the assignment of an analog input to a specified member of a specified class;
  the assignment of an analog output to a specified member of a specified class;
  the assignment of a digital alarm to a specified member of a specified class;
  the assignment of a digital input to a specified member of a specified class;
  the assignment of a digital output to a specified member of a specified class; and
  the creation of an instance of an equipment class.

Figure 35:
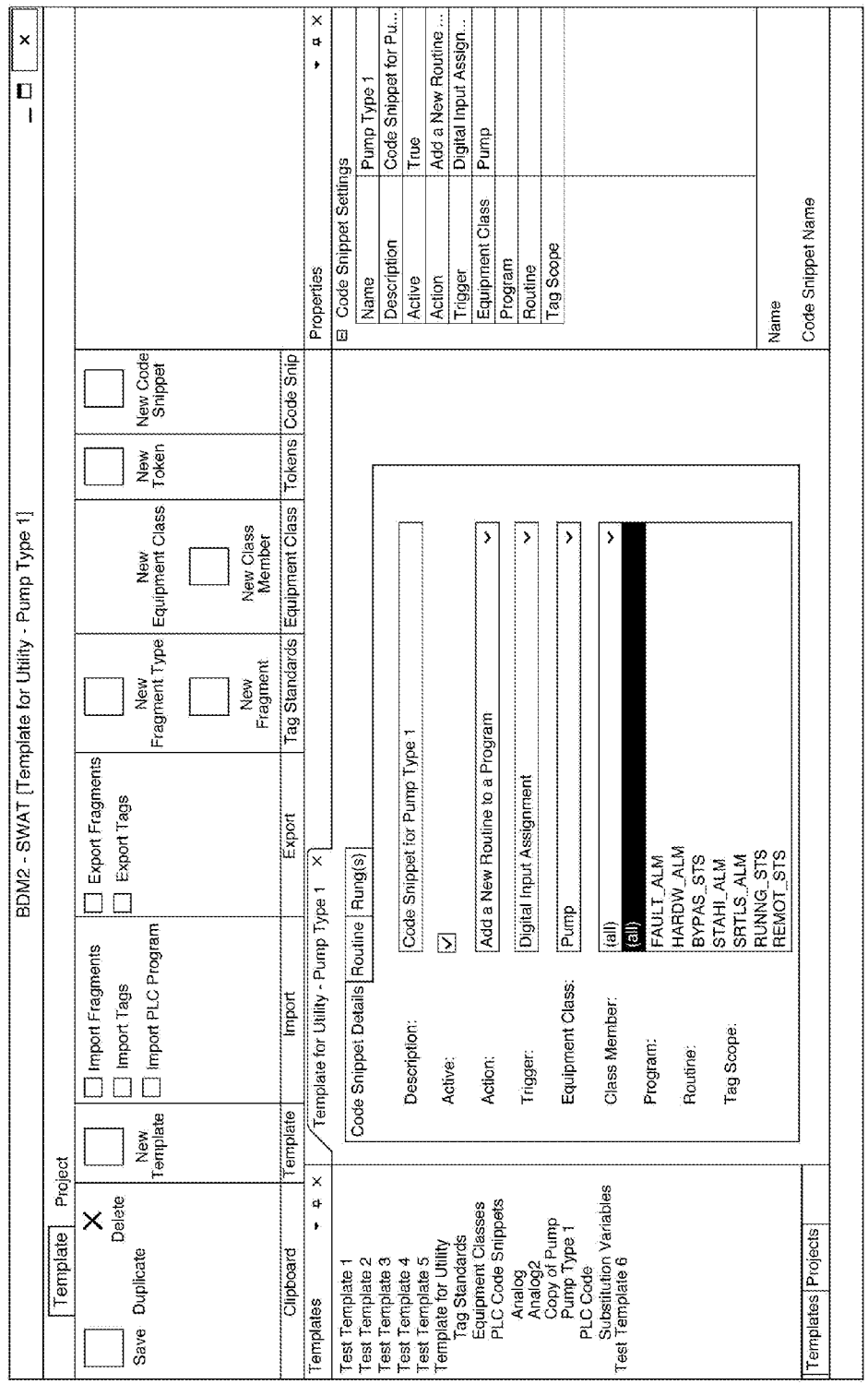
FIG. 35 is a view of the screen of a computer specially adapted to carry out a method according to an exemplary embodiment of the invention, in use

By way of example, FIG. 35, shows a step in the creation of the snippet "Pump Type 1", which causes a routine to be added to a program each time a digital input is assigned to a device of the class "pump"; the dropdown shows that the routine can be added only in respect of a single specified member or all members in the class can be specified. Notably, it will be appreciated that the dropdown of class members only shows class members that as specified as having an I/O type of "digital input".

Figure 36:
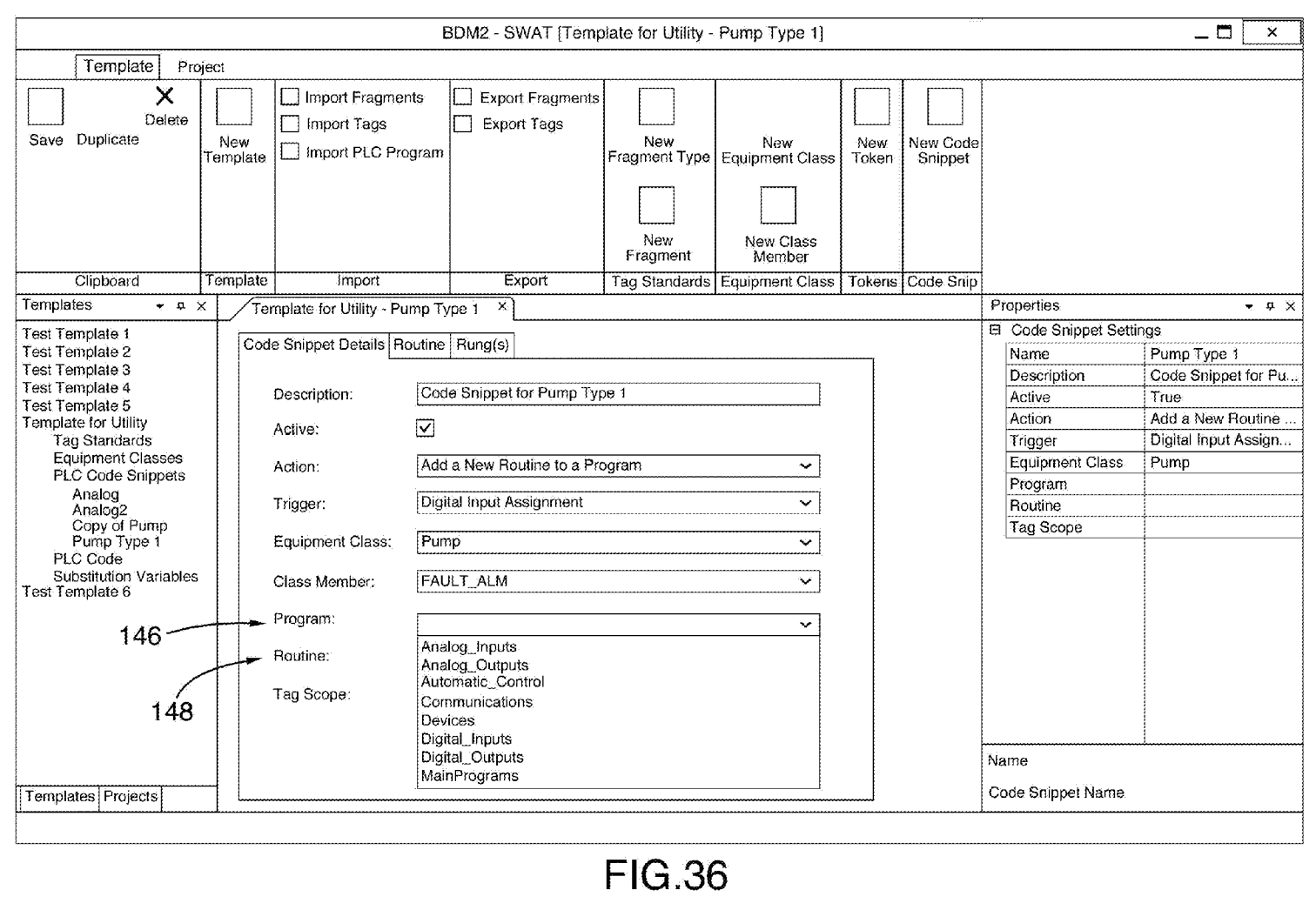

The routine that is added and the program to which the routine is added are specified by suitable toggling of Program dropdown 146 and Routine dropdown 148, which provide listings of available programs and routines from the PLC code, all as indicated in FIG. 36.

Figure 37:
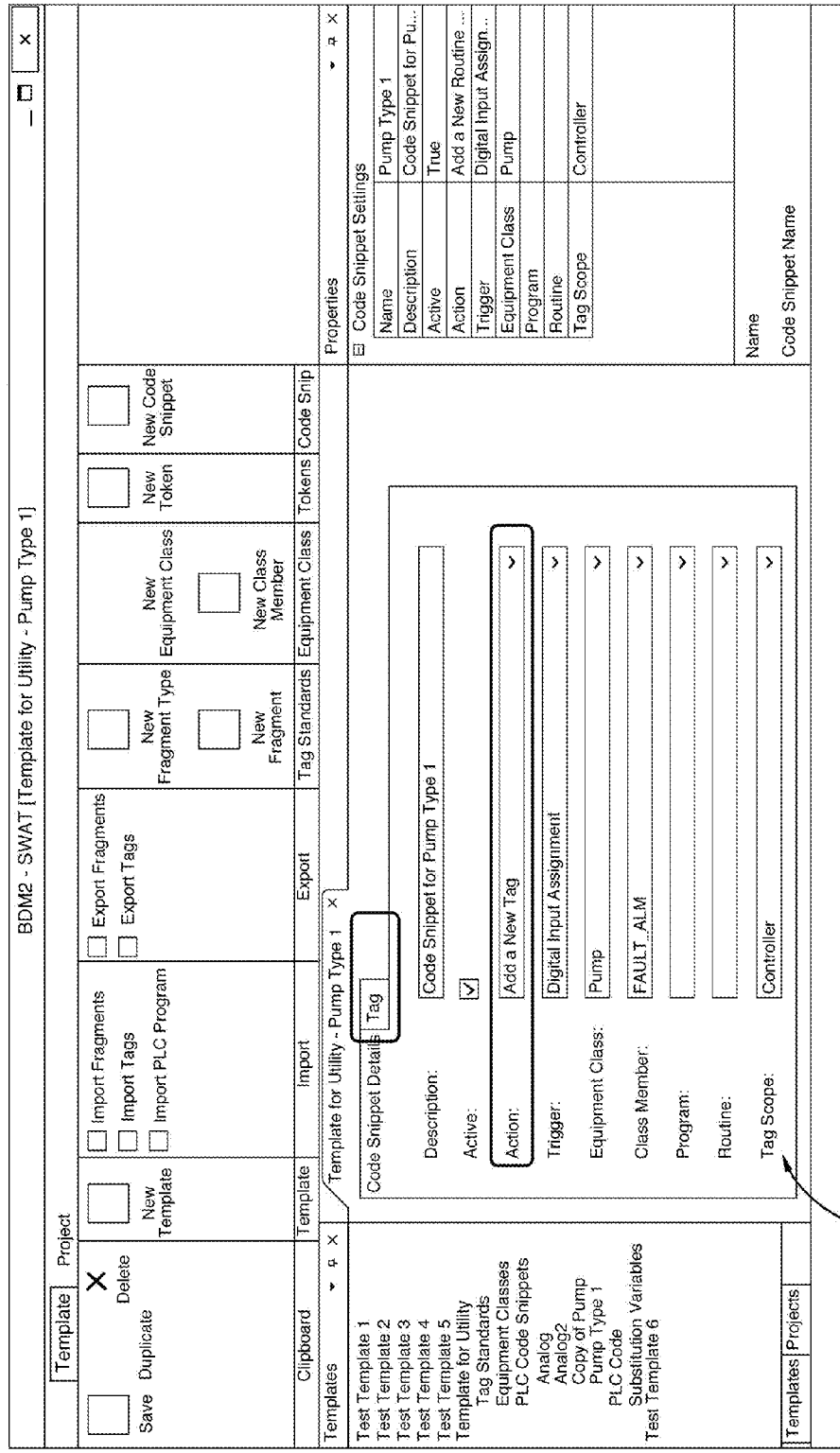
FIG. 37 is a view of the screen of a computer specially adapted to carry out a method according to an exemplary embodiment of the invention, in use
Figure 38:
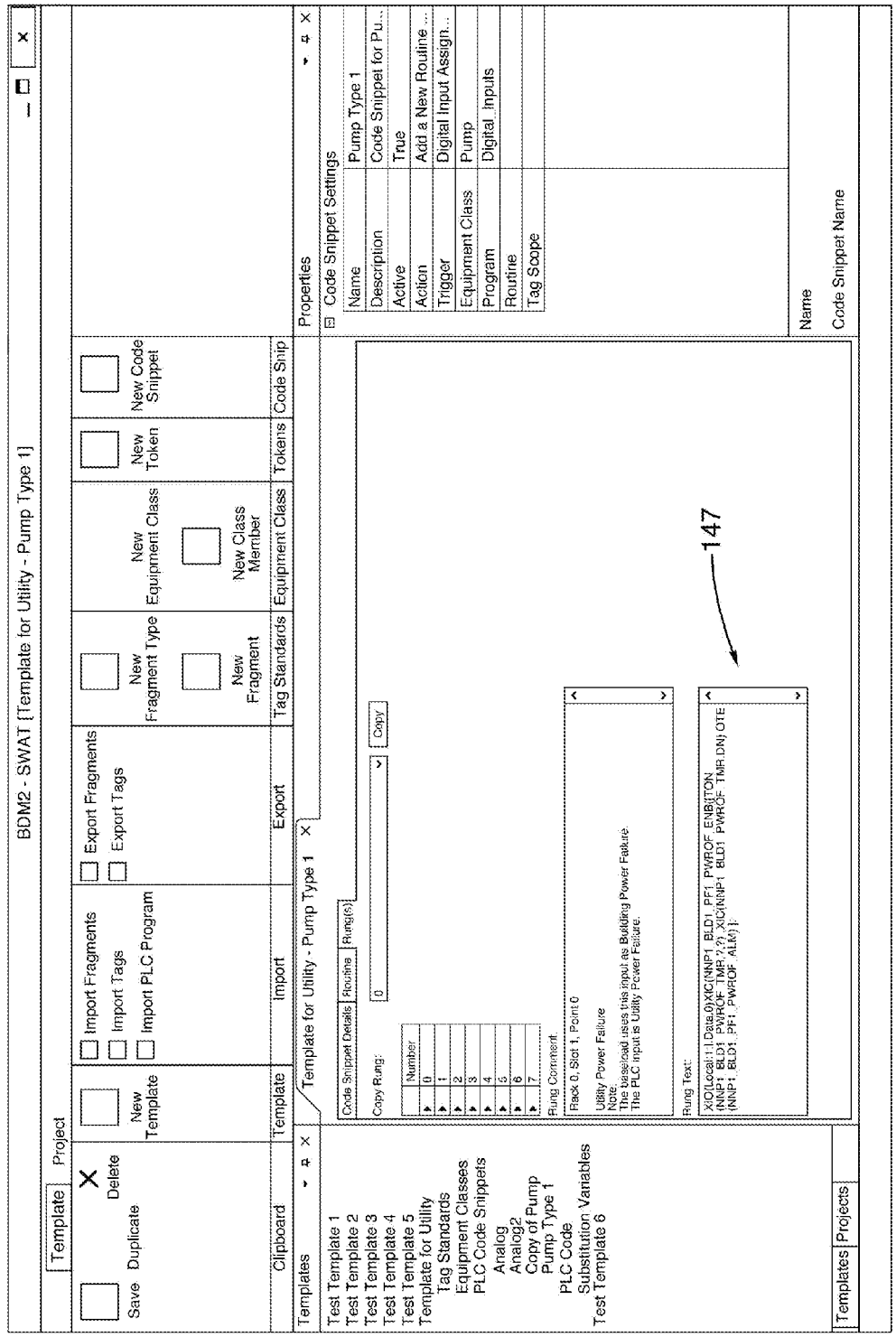
FIG. 38 is a view of the screen of a computer specially adapted to carry out a method according to an exemplary embodiment of the invention, in use

Similar procedures are followed in respect of the addition of rungs, and tags:
  in the context of the addition of a new tag, a Tag Scope dropdown 150 is enabled, which provides a list of tags available for selection [again, of the type specified by the trigger], as indicated by FIG. 37
  in the context of the addition of a new rung, a rung text entry box 147 is enabled, as is the Routine dropdown 148, to which the rung is added, as suggested by FIG. 38.

Static Variables

Figure 39:
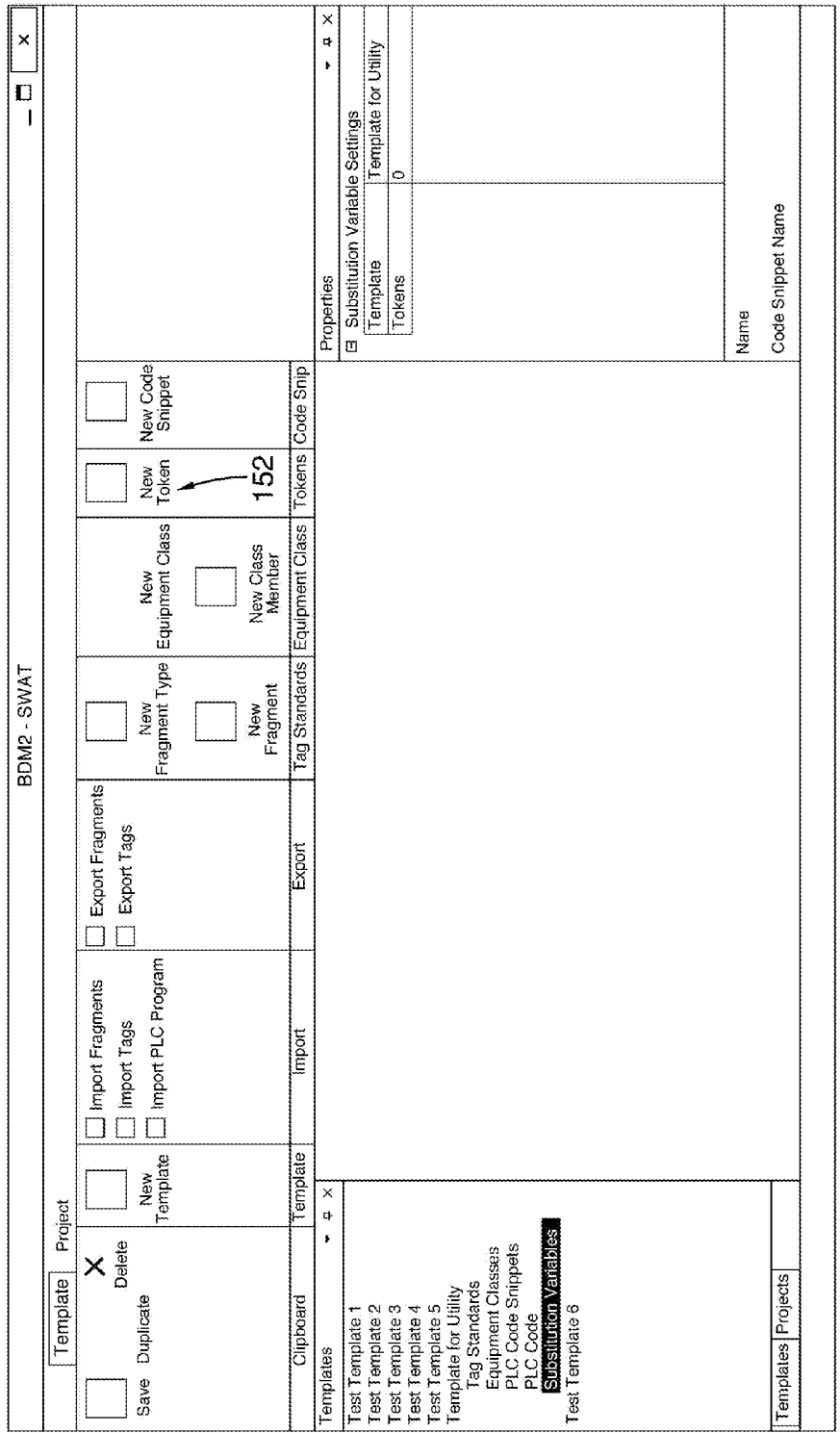
FIG. 39 is a view of the screen of a computer specially adapted to carry out a method according to an exemplary embodiment of the invention, in use
Figure 40:
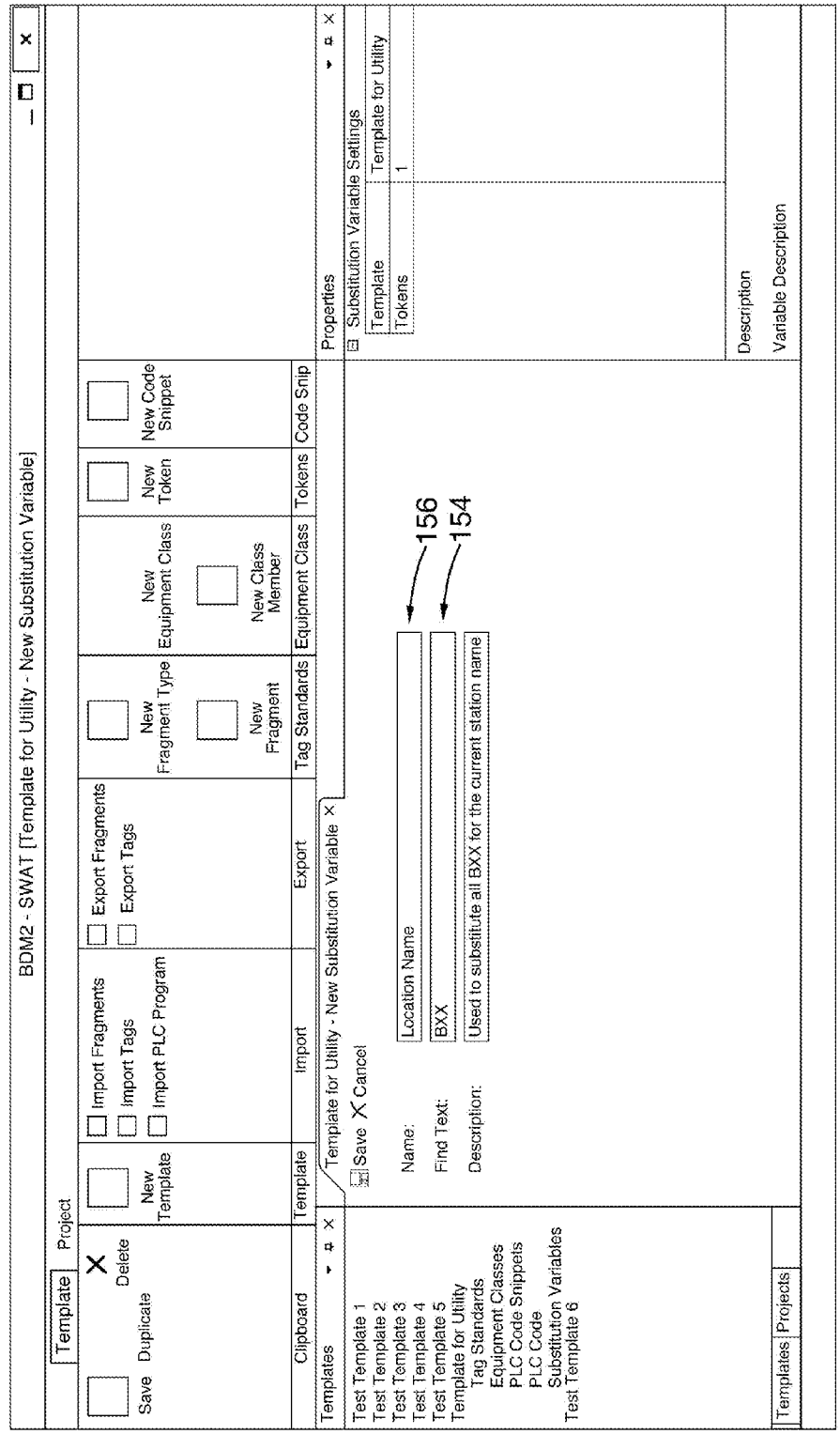
FIG. 40 is a view of the screen of a computer specially adapted to carry out a method according to an exemplary embodiment of the invention, in use

Another of these additional labour-saving features is associated with the optional creation of user-defined static variable substitution relationships within the template, the relationships providing for:

a portion of the PLC logic to be associated with a user-defined variable;

the user defined variable being substituted for that portion of the PLC logic at each instance In this regard, reference is made to FIG. 39. Herein it will be seen that the toolbar includes a New Token 152 button. Selection of the New Token button 152 creates a data entry screen wherein a substitution relationship can be created by entry of suitable text strings into each of the Find Text entry box 154 and Name text entry box 156, as shown in FIG. 40. By way of example, FIG. 40 shows a relationship wherein each instance of the string "BXX" in the PLC code is replaced with the string "Location Name". This functionality is equivalent to a "Find and Replace" tool in, for example, a word processor.

Dynamic Variables

A yet further labour-saving feature is associated with the optional creation of user-defined dynamic variable substitution relationship, the relationships providing for:

a portion of one of the PLC logics to be associated with a system variable [a discrete portion of a tag structure or an I/o hardware point];

a programming code is substituted for that portion of the PLC logic wherever it appears, the code being context-dependent, specifically:

for variables associated with discrete portions of a tag structure such that, as the tags and PLC logic for a piece of equipment are replicated, in the tag for said piece of equipment, that discrete portion is populated in accordance with the properties of that piece of equipment for variables associated with an I/O hardware point such that the associated I/O address for said I/O point is auto-populated throughout the PLC tag database and PLC program logic when the PLC card type, rack and slots are assigned.

Figure 41:
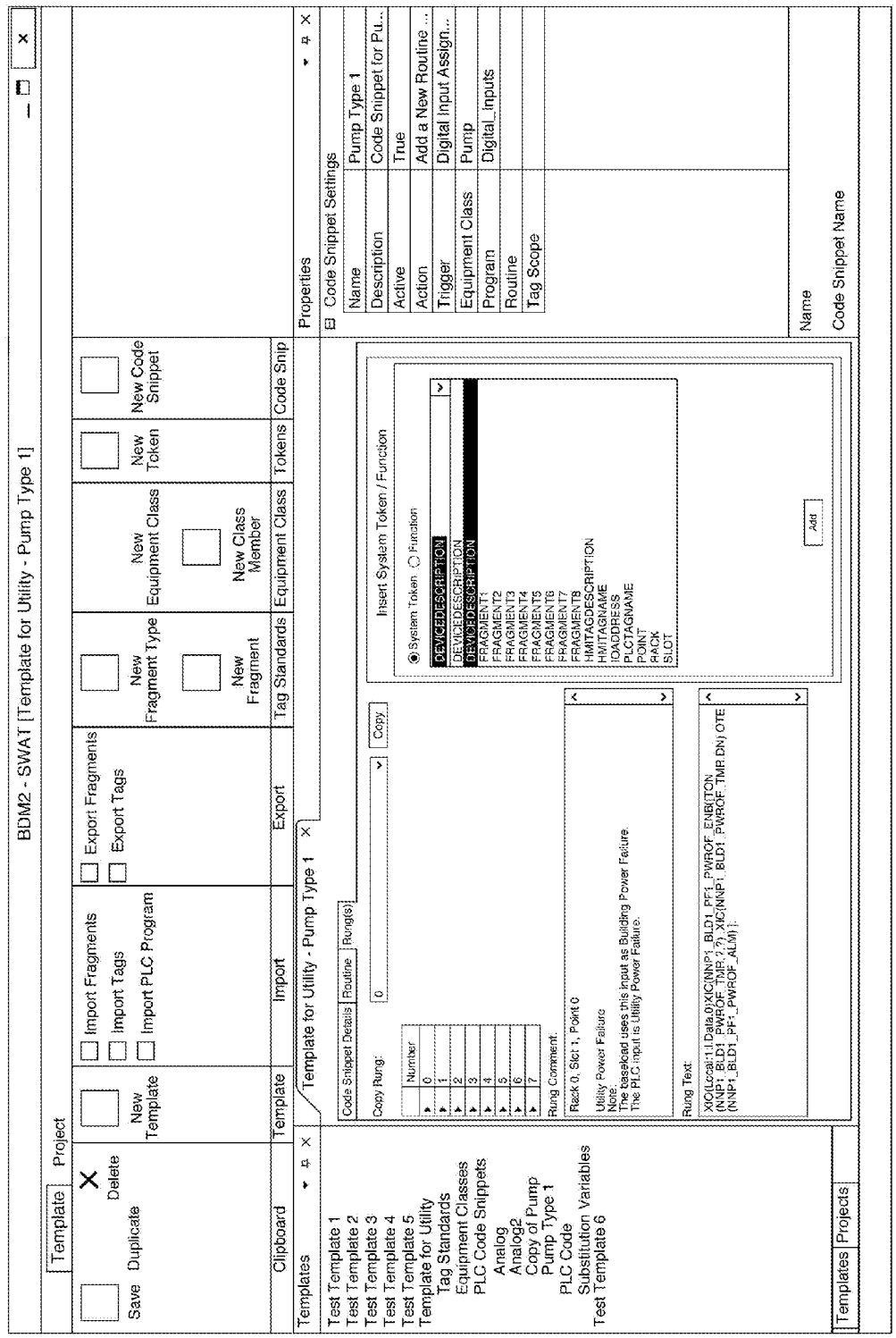
FIG. 41 is a view of the screen of a computer specially adapted to carry out a method according to an exemplary embodiment of the invention, in use
Figure 42:
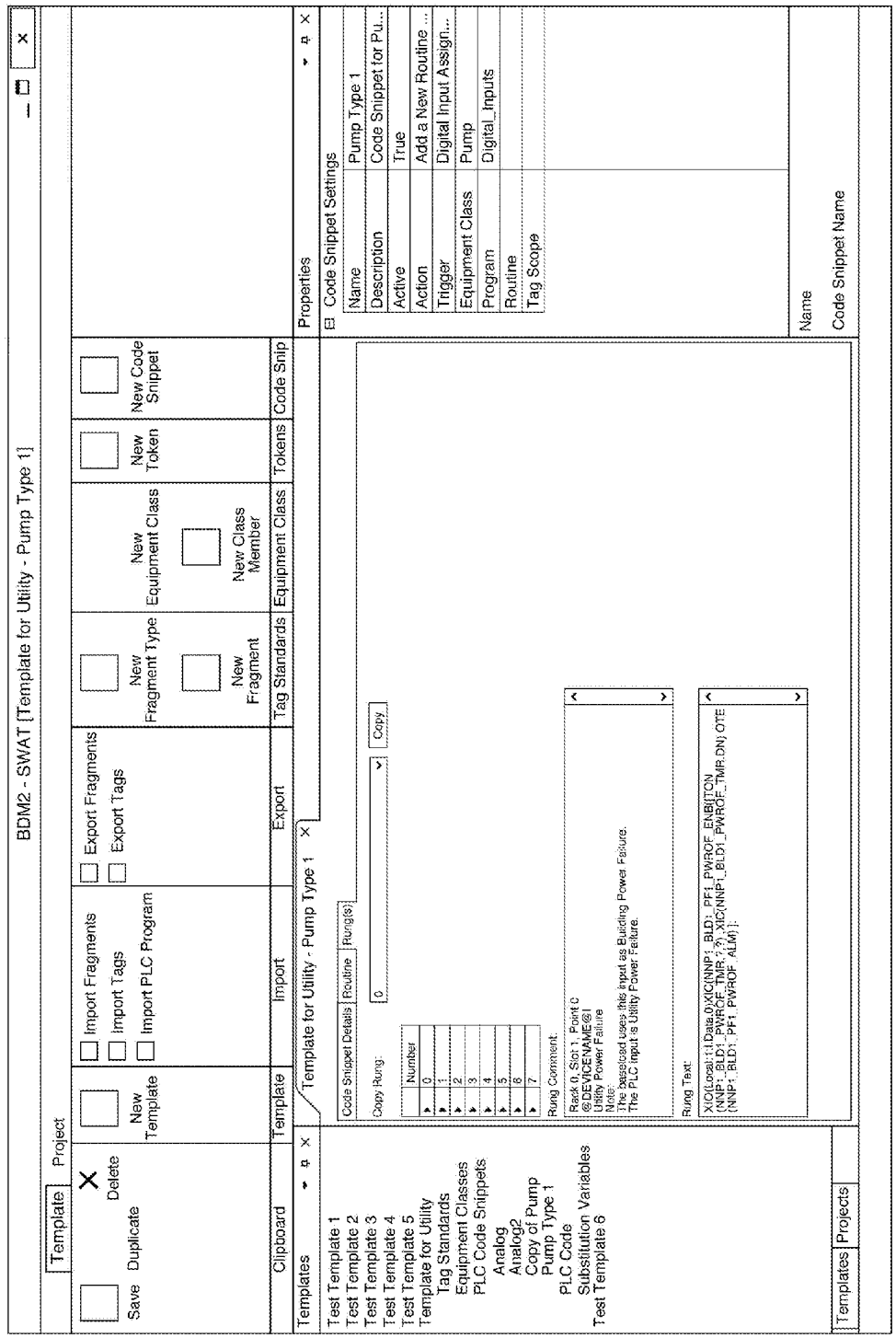
FIG. 42 is a view of the screen of a computer specially adapted to carry out a method according to an exemplary embodiment of the invention, in use

By way of example, reference is made to FIGS. 41 and 42, which show dynamic variable DEVICENAME being inserted into a rung comment. Thus, each time this rung comment is replicated in the PLC, the name of the device associated with the replication is substituted into the comment field. Although FIGS. 41 and 42 show DEVICENAME being inserted, it will be appreciated that any of the other defined, discrete portions of the template tag structure can be inserted, in this case, any of:

"DEVICE DESCRIPTION", "FRAGMENT 1", "FRAGMENT 2", "FRAGMENT 3", "FRAGMENT 4", "FRAGMENT 5", "FRAGMENT 6", "FRAGMENT 7" and "FRAGMENT 8"

Similarly, any of the available I/O hardware points can be inserted, in this case:

"HMIT AG DESCRIPTION", "HMIT AGNAME", "I/O ADDRESS", ""PLCTAGNAME", "POINT", "RACK" and "SLOT"

And these will be auto-populated appropriately throughout as the I/O hardware points are assigned during the final code creation.

Notably, it will be appreciated that the substitution relationships can be created within the base code and also within the code snippets.

Whereas a single exemplary embodiment is herein described, it will be understood that variations are possible. For example, whereas the exemplary embodiment involves separate template and project definition steps, it will be appreciated that this is not necessary; these steps could readily be merged.

As well, whereas in the exemplary embodiment, a single application provides both the template builder and project builder functions, this is not required. The invention could, for example, be embodied in separate Project Builder and Template Builder programs.

Accordingly, the invention should be understood as limited only by the accompanying claims, purposively construed.

What is claimed is:

1. A method: for use with a set of fragment types and with a set of tag values for each fragment type; for use with a collection of PLC programming, the collection containing a PLC programming code for each of a plurality of classes of equipment; and for producing a PLC tag database for a project, the method comprising software instructions executed by a hardware processor to perform the steps of:

in respect of the project:
selecting the classes of equipment required for the project; and
selecting, in respect of each class of equipment selected, the quantity required;
in respect of each class of equipment selected, and through the use of the set of fragment types, the sets of tag values and the collection of PLC programming, replicating, a number of times equal to the quantity of said each class selected,
a PLC logic associated with the PLC programming code for said each class; and
tags defined by the PLC logic and in accordance with a tag naming convention; and
assigning a specific PLC card type, rack and slot to selected tags in accordance with the requirements of the project;
wherein the set of fragment types is a user-defined subset of the tag naming convention, the set of tag fragment values is a user-defined subset of the tag naming convention and the PLC programming code for each selected class is a user-defined subset of a standard PLC tag and logic file.

2. A method: for use with a set of fragment types and with a set of tag values for each fragment type; for use with a collection of PLC programming, the collection containing a PLC programming code for each of a plurality of classes of equipment; and for producing a PLC tag database for a project, the method comprising software instructions executed by a hardware processor to perform the steps of:

in respect of the project:
selecting the classes of equipment required for the project; and
selecting, in respect of each class of equipment selected, the quantity required;
in respect of each class of equipment selected, and through the use of the set of fragment types, the sets of tag values and the collection of PLC programming, replicating, a number of times equal to the quantity of said each class selected,
a PLC logic associated with the PLC programming code for said each class; and
tags defined by the PLC logic and in accordance with a tag naming convention; and
assigning a specific PLC card type, rack and slot to selected tags in accordance with the requirements of the project;
wherein the replicating step comprises the creation of:
a plurality of user-defined equipment classes from which the classes required for the project are selected;

a plurality of user-defined linkages between each user-defined class of equipment and a portion of a standard PLC tag and logic file, each linkage being associated with the definition of a member of said each class;

in respect of each member, a user-defined data type, a user defined field I/O type and definitions of associated fragment properties.

3. A method according to claim 2, wherein the replicating step further comprises the creation of one or more of:

a user-defined static variable substitution relationship associating a portion of one of the PLC logics with a user-defined variable such that, as the replicating step is carried out, each time that one of the PLC logics is replicated, the user defined variable is substituted for that portion;

a user-defined dynamic variable substitution relationship associating a portion of one of the PLC logics with a system variable such that, as the replicating is carried out, each time that portion of the one of the PLC logics is replicated, a programming code is substituted therefor, the substituted programming code being context-dependent; and a user-defined code snippet, associated substitution rule and associated trigger, the trigger being defined by one or more of equipment class, member and I/O type, such that, as the replicating is carried out, the code snippet is replicated in accordance with the associated substitution rule for each instance of the associated trigger.

4. A method according to claim 3, wherein each dynamic variable can be associated with a discrete portion of a tag structure such that, as the tags and PLC logic for a piece of equipment are replicated, in the tag for said piece of equipment, that discrete portion is populated in accordance with the properties of that piece of equipment.

5. A method according to claim 4, wherein the replicating step further comprises the creation of a template including:

the subsets of the tag naming convention and the user-defined equipment classes;

the plurality of linkages between class of equipment and the portion of a standard PLC tag and logic file;

in respect of each member, the defined data type and field I/O and associated fragment property definitions;

the static variable substitution relationships;

the dynamic substitution relationships; and the code snippets, associated substitution rules and associated triggers.

6. A method according to claim 5, wherein, in the template, the associated fragment property definitions include indications if the fragment is defined within the template.

7. A method according to claim 6, wherein:

the template includes, in respect of fragments in respect of which the template provides an indication of inclusion, definitions; and fragments for the project, other than those in respect of which the template provides an indication of inclusion, are defined as part of a project definition step wherein the selection of equipment and quantities thereof also takes place.

8. A method according to claim 4, wherein: the replicating step further comprises the creation of, in respect of each member, HMI tag properties; and the method results in the production of an HMI tag database.

9. A method according to claim 8, wherein each dynamic variable can be associated with an I/O hardware point such that the associated I/O address for said I/O point is auto-populated throughout the PLC tag database when the PLC card type, rack and slots are assigned.

10. A method according to claim 9, wherein the replicating step further comprises the creation of a template including:

the subsets of the tag naming convention and the user-defined equipment classes;

the plurality of linkages between class of equipment and the portion of a standard PLC tag and logic file;

in respect of each member, the defined data type and field I/O and associated fragment property definitions;

the static and dynamic variable substitution relationships, the code snippets, associated substitution rules and associated triggers; and in respect of each member, the HMI tag properties.

11. A method according to claim 10, wherein, in the template, the associated fragment property definitions include indications if the fragment is defined within the template.

12. A method according to claim 11, wherein:

the template includes, in respect of fragments in respect of which the template provides an indication of inclusion, definitions; and fragments for the project, other than those in respect of which the template provides an indication of inclusion, are defined as part of a project definition step wherein the selection of equipment and quantities thereof also takes place.

13. A method according to claim 12, wherein the substitution rules associated with the code snippets provide for one of: the addition of a new routine to a program; the addition of a new rung to a routine; and the addition of a new tag.

14. A method according to claim 13, wherein the triggers comprise:

the assignment of an analog input to an equipment class member;

the assignment analog output to an equipment class member;

the assignment digital alarm to an equipment class member;

the assignment digital input to an equipment class member;

the assignment digital output to an equipment class member; and the creation of an instance of an equipment class.

15. A method according to claim 12, wherein the code snippets form part of the PLC logic in respect of which portions may be associated with the dynamic and static substitution variables.

16. A computer specially designed for use in a method, the method being: for use with a set of fragment types and with a set of tag values for each fragment type; for use with a collection of PLC programming, the collection containing a PLC programming code for each of a plurality of classes of equipment; and for producing a PLC tag database for a project, the method comprising software instructions executed by a hardware processor to perform the steps of:

in respect of the project:

selecting the classes of equipment required for the project; and selecting, in respect of each class of equipment selected, the quantity required;

in respect of each class of equipment selected, and through the use of the set of fragment types, the sets of tag values and the collection of PLC programming, replicating, a number of times equal to the quantity of said each class selected, a PLC logic associated with the PLC programming code for said each class; and
tags defined by the PLC logic and in accordance with a tag naming convention; and
assigning a specific PLC card type, rack and slot to selected tags in accordance with the requirements of the project;
wherein the replicating step comprises the creation of:
a plurality of user-defined equipment classes from which the classes required for the project are selected;
a plurality of user-defined linkages between each user-defined class of equipment and a portion of a standard PLC tag and logic file, each linkage being associated with the definition of a member of said each class;
in respect of each member, a user-defined data type, a user defined field I/O type and definitions of associated fragment properties;
wherein the replicating step further comprises the creation of one or more of:
a user-defined static variable substitution relationship associating a portion of one of the PLC logics with a user-defined variable such that, as the replicating step is carried out, each time that one of the PLC logics is replicated, the user defined variable is substituted for that portion;
a user-defined dynamic variable substitution relationship associating a portion of one of the PLC logics with a system variable such that, as the replicating is carried out, each time that portion of the one of the PLC logics is replicated, a programming code is substituted therefor, the substituted programming code being context-dependent; and
a user-defined code snippet, associated substitution rule and associated trigger, the trigger being defined by one or more of equipment class, member and I/O type, such that, as the replicating is carried out, the code snippet is replicated in accordance with the associated substitution rule for each instance of the associated trigger; and
wherein the replicating step further comprises the creation of a template including:
the subsets of the tag naming convention and the user-defined equipment classes;
the plurality of linkages between class of equipment and the portion of a standard PLC tag and logic file;
in respect of each member, the defined data type and field I/O and associated fragment property definitions;
the static variable substitution relationships;
the dynamic substitution relationships; and
the code snippets, associated substitution rules and associated triggers;
the computer comprising software instructions executed by the hardware processor to produce the template.

17. A computer specially designed for use in a method for a project, the method being: for use with a set of fragment types and with a set of tag values for each fragment type; for use with a collection of PLC programming, the collection containing a PLC programming code for each of a plurality of classes of equipment; and for producing a PLC tag database for a project, the method comprising software instructions executed by a hardware processor to perform the steps of:

in respect of the project:
selecting the classes of equipment required for the project; and
selecting, in respect of each class of equipment selected, the quantity required;
in respect of each class of equipment selected, and through the use of the set of fragment types, the sets of tag values and the collection of PLC programming, replicating, a number of times equal to the quantity of said each class selected,
a PLC logic associated with the PLC programming code for said each class; and
tags defined by the PLC logic and in accordance with a tag naming convention; and
assigning a specific PLC card type, rack and slot to selected tags in accordance with the requirements of the project;
wherein the replicating step comprises the creation of:
a plurality of user-defined equipment classes from which the classes required for the project are selected;
a plurality of user-defined linkages between each user-defined class of equipment and a portion of a standard PLC tag and logic file, each linkage being associated with the definition of a member of said each class;
in respect of each member, a user-defined data type, a user defined field I/O type and definitions of associated fragment properties;
wherein the replicating step further comprises the creation of one or more of:
a user-defined static variable substitution relationship associating a portion of one of the PLC logics with a user-defined variable such that, as the replicating step is carried out, each time that one of the PLC logics is replicated, the user defined variable is substituted for that portion;
a user-defined dynamic variable substitution relationship associating a portion of one of the PLC logics with a system variable such that, as the replicating is carried out, each time that portion of the one of the PLC logics is replicated, a programming code is substituted therefor, the substituted programming code being context-dependent; and
a user-defined code snippet, associated substitution rule and associated trigger, the trigger being defined by one or more of equipment class, member and I/O type, such that, as the replicating is carried out, the code snippet is replicated in accordance with the associated substitution rule for each instance of the associated trigger; and
wherein the replicating step further comprises the creation of a template including:
the subsets of the tag naming convention and the user-defined equipment classes;
the plurality of linkages between class of equipment and the portion of a standard PLC tag and logic file;
in respect of each member, the defined data type and field I/O and associated fragment property definitions;
the static variable substitution relationships;
the dynamic substitution relationships; and
the code snippets, associated substitution rules and associated triggers;
the computer comprising the software instructions executed by the hardware processor to, with the template, perform the steps of:

in respect of the project:
  selecting the classes of equipment required for the project; and
  selecting, in respect of each class of equipment selected, the quantity required; in respect of each class of equipment selected, and through the use of the template, replicating, a number of times equal to the quantity of said each class selected,
  a PLC logic associated with the PLC programming code for said each class; and
  tags defined by the PLC logic and in accordance with a tag naming convention; and
assigning a specific PLC card type, rack and slot to selected tags in accordance with the requirements of the project.

* * * * *